US012629654B2

(12) United States Patent
Francis et al.

(10) Patent No.: US 12,629,654 B2
(45) Date of Patent: May 19, 2026

(54) CONCENTRATION OF CHEMICAL SPECIES THROUGH THE USE OF PHOTOSENSTIVE SORBENT MATERIALS

(71) Applicant: Genesis Systems LLC, Tampa, FL (US)

(72) Inventors: Kurt Francis, Yuma, AZ (US); Owen Erickson, Largo, FL (US); David Stuckenberg, Tampa, FL (US)

(73) Assignee: Genesis Systems LLC, Tampa, FL (US)

( * ) Notice: Subject to any disclaimer, the term of this patent is extended or adjusted under 35 U.S.C. 154(b) by 323 days.

(21) Appl. No.: 18/538,832

(22) Filed: Dec. 13, 2023

(65) Prior Publication Data

US 2025/0196095 A1 Jun. 19, 2025

(51) Int. Cl.
*B01D 53/02* (2006.01)
*B01D 53/04* (2006.01)
(Continued)

(52) U.S. Cl.
CPC ........ *B01J 20/226* (2013.01); *B01D 53/0462* (2013.01); *B01D 53/047* (2013.01);
(Continued)

(58) Field of Classification Search
CPC .......... B01D 2257/80; B01D 2257/504; B01D 5/0003; B01D 5/0051; B01D 5/0081; B01D 5/009; B01D 53/002; B01D 53/02; B01D 53/0462; B01D 53/047; B01D 53/18; B01D 53/263; B01F 23/20; B01F 23/214; B01J 20/223; B01J 20/226; B01J 20/3204;
(Continued)

(56) References Cited

U.S. PATENT DOCUMENTS

| | | | |
|---|---|---|---|
| 4,134,269 | A | 1/1979 | Arzet |
| 4,315,599 | A | 2/1982 | Biancardi |

(Continued)

FOREIGN PATENT DOCUMENTS

| | | | |
|---|---|---|---|
| CN | 1223325 | A | 7/1999 |
| CN | 203675747 | U | 7/2014 |

(Continued)

OTHER PUBLICATIONS

English Translation of JP Office Action dated Apr. 3, 2025 for JP Application No. 2023537236, 5 page(s).

(Continued)

*Primary Examiner* — Christopher P Jones

(57) ABSTRACT

A device comprising a photosensitive sorbent material is configured to concentrate a target chemical species. The photosensitive sorbent material has a stepped Type F-IV isotherm profile with a high working capacity and can adsorb the target chemical species in a porous open phase. The photosensitive material can be converted into a less porous closed phase upon exposure to light of a certain wavelength through a photochemical transformation to allow for desorption and collection of the target chemical species. The photosensitive material can be converted back to the open phase upon exposure to light of a different wavelength for regeneration and this process can be repeated cycles of adsorption and desorption.

20 Claims, 16 Drawing Sheets

(51) Int. Cl.

| | |
|---|---|
| ***B01D 53/047*** | (2006.01) |
| ***B01J 20/22*** | (2006.01) |
| ***B01J 20/34*** | (2006.01) |

(52) U.S. Cl.
CPC ..... *B01J 20/3441* (2013.01); *B01D 2257/504* (2013.01); *B01D 2257/80* (2013.01)

(58) Field of Classification Search
CPC ....... B01J 20/3441; E03B 3/28; F24F 3/1417; Y02A 20/00; Y02A 40/25; F25D 17/06; Y02P 60/12
See application file for complete search history.

(56) References Cited

U.S. PATENT DOCUMENTS

| | | | |
|---|---|---|---|
| 4,323,424 | A | 4/1982 | Secunda et al. |
| 4,344,778 | A | 8/1982 | Matsuoka et al. |
| 5,601,236 | A | 2/1997 | Wold |
| 5,634,342 | A | 6/1997 | Peeters et al. |
| 5,857,344 | A | 1/1999 | Rosenthal |
| 6,156,102 | A | 12/2000 | Conrad et al. |
| 6,499,309 | B1 | 12/2002 | Yeh |
| 6,574,979 | B2 | 6/2003 | Faqih |
| 6,581,849 | B2 | 6/2003 | Zhang |
| 6,709,198 | B2 | 3/2004 | Wachtel |
| 7,293,420 | B2 | 11/2007 | Max |
| 7,337,615 | B2 | 3/2008 | Reidy |
| 7,687,432 | B2 * | 3/2010 | Zhou .................. B01J 20/28078 502/401 |
| 7,895,847 | B2 | 3/2011 | Larsen |
| 7,942,011 | B2 | 5/2011 | Forkosh |
| 8,028,527 | B2 | 10/2011 | Vidmar |
| 8,321,061 | B2 | 11/2012 | Anderson |
| 8,519,012 | B2 | 8/2013 | O'Connor |
| 8,754,269 | B2 | 6/2014 | O'Connor |
| 8,820,107 | B2 | 9/2014 | Parent |
| 9,101,093 | B2 | 8/2015 | Chance et al. |
| 9,550,142 | B2 | 1/2017 | Roestenberg et al. |
| 9,751,039 | B2 | 9/2017 | Gebald et al. |
| 9,969,665 | B2 | 5/2018 | O'Connor et al. |
| 10,232,305 | B2 | 3/2019 | Gebald et al. |
| 10,260,761 | B2 | 4/2019 | Martin |
| 10,279,306 | B2 | 5/2019 | Gebald et al. |
| 10,350,547 | B2 | 7/2019 | Bijl et al. |
| 10,427,086 | B2 | 10/2019 | Gebald et al. |
| 10,583,389 | B2 | 3/2020 | Stuckenberg |
| 10,807,042 | B2 | 10/2020 | Bijl et al. |
| 10,882,743 | B2 | 1/2021 | O'Connor |
| 11,000,799 | B2 | 5/2021 | Stuckenberg |
| 11,007,470 | B2 | 5/2021 | Wurzbacher et al. |
| 11,285,425 | B2 | 3/2022 | Sauerbeck et al. |
| 11,359,356 | B2 | 6/2022 | Friesen et al. |
| 11,420,149 | B2 | 8/2022 | Gebald et al. |
| 11,441,393 | B2 | 9/2022 | Meehan et al. |
| 11,572,765 | B2 | 2/2023 | Meehan et al. |
| 11,612,879 | B2 | 3/2023 | Gebald et al. |
| 11,712,652 | B2 | 8/2023 | Spiteri et al. |
| 2003/0091908 | A1 * | 5/2003 | Takayanagi ............... G03F 1/56 430/323 |
| 2003/0122557 | A1 * | 7/2003 | Capobianchi ........ G01N 27/126 257/432 |
| 2004/0079228 | A1 | 4/2004 | Wijmans et al. |
| 2004/0244398 | A1 | 12/2004 | Radermacher et al. |
| 2007/0028769 | A1 | 2/2007 | Eplee et al. |
| 2007/0079624 | A1 | 4/2007 | Max |
| 2007/0186768 | A1 | 8/2007 | Coors |
| 2008/0135495 | A1 | 6/2008 | Sher |
| 2009/0183631 | A1 | 7/2009 | Hall et al. |
| 2010/0213201 | A1 | 8/2010 | Schultz et al. |
| 2012/0048117 | A1 | 3/2012 | Katzir et al. |
| 2012/0193213 | A1 | 8/2012 | James |
| 2013/0003057 | A1 * | 1/2013 | Mano ..................... G01N 1/405 356/301 |
| 2013/0227879 | A1 | 9/2013 | Lehky |
| 2013/0340458 | A1 | 12/2013 | Shaw et al. |
| 2014/0048467 | A1 | 2/2014 | Matsuura |
| 2014/0352536 | A1 | 12/2014 | Dahlback et al. |
| 2015/0265962 | A1 | 9/2015 | Dahlback et al. |
| 2016/0102874 | A1 | 4/2016 | Buchholz et al. |
| 2016/0211796 | A1 | 7/2016 | Hammad et al. |
| 2016/0237659 | A1 | 8/2016 | Thielow et al. |
| 2016/0296884 | A1 | 10/2016 | Tremel et al. |
| 2016/0336467 | A1 | 11/2016 | Janet |
| 2017/0282131 | A1 | 10/2017 | Berzinis et al. |
| 2018/0167591 | A1 | 6/2018 | Maliuk |
| 2018/0209123 | A1 | 7/2018 | Bahrami et al. |
| 2018/0271086 | A1 | 9/2018 | Meinel et al. |
| 2018/0361323 | A1 | 12/2018 | Vilagines et al. |
| 2018/0362366 | A1 | 12/2018 | Shahriari et al. |
| 2019/0001279 | A1 | 1/2019 | Scherzer et al. |
| 2019/0060820 | A1 | 2/2019 | O'Connor |
| 2019/0153704 | A1 | 5/2019 | Gido et al. |
| 2019/0242595 | A1 | 8/2019 | Eplee |
| 2019/0331353 | A1 | 10/2019 | Edstrm et al. |
| 2020/0332498 | A1 | 10/2020 | Friesen et al. |
| 2021/0093996 | A1 | 4/2021 | Cremaschi |
| 2021/0162338 | A1 | 6/2021 | Zaworotko et al. |
| 2021/0205783 | A1 | 7/2021 | O'Connor |
| 2021/0229028 | A1 | 7/2021 | Stuckenberg |
| 2021/0244059 | A1 | 8/2021 | Sobel et al. |
| 2022/0176310 | A1 | 6/2022 | Suter et al. |
| 2022/0193598 | A1 | 6/2022 | Suter et al. |
| 2022/0195706 | A1 | 6/2022 | Stuckenberg et al. |
| 2022/0228351 | A1 | 7/2022 | Friesen et al. |
| 2022/0288505 | A1 | 9/2022 | Stuckenberg et al. |
| 2023/0160283 | A1 | 5/2023 | Meehan et al. |
| 2023/0173427 | A1 | 6/2023 | Repond et al. |
| 2023/0201759 | A1 | 6/2023 | Spiteri et al. |
| 2023/0211276 | A1 | 7/2023 | Spiteri et al. |
| 2023/0233985 | A1 | 7/2023 | Vargas et al. |
| 2023/0241551 | A1 | 8/2023 | Friesen et al. |
| 2023/0249123 | A1 | 8/2023 | Stuckenberg |
| 2023/0407609 | A1 | 12/2023 | Stuckenberg et al. |

FOREIGN PATENT DOCUMENTS

| | | | |
|---|---|---|---|
| CN | 104775476 | A | 7/2015 |
| CN | 107476380 | A | 12/2017 |
| CN | 212881072 | U | 4/2021 |
| DE | 19632272 | A1 | 2/1998 |
| DE | 10154351 | A1 | 5/2003 |
| EP | 2631549 | A1 | 8/2013 |
| EP | 2643530 | A1 | 10/2013 |
| EP | 3481535 | A1 | 5/2019 |
| IL | 246467 | | 11/2016 |
| JP | 55-152521 | A | 11/1980 |
| JP | 2003-320240 | A | 11/2003 |
| JP | 2008-511774 | A | 4/2008 |
| WO | 2006/026494 | A1 | 3/2006 |
| WO | 2006/129200 | A2 | 12/2006 |
| WO | 2008/018071 | A2 | 2/2008 |
| WO | 2010/002918 | A1 | 1/2010 |
| WO | 2011/062554 | A1 | 5/2011 |
| WO | 2011/150081 | A2 | 12/2011 |
| WO | 2012/073794 | A1 | 6/2012 |
| WO | 2012/162545 | A2 | 11/2012 |
| WO | 2013/002612 | A2 | 1/2013 |
| WO | 2015/162599 | A2 | 10/2015 |
| WO | 2016/081863 | A1 | 5/2016 |
| WO | 2016/187709 | A1 | 12/2016 |
| WO | 2018/002918 | A1 | 1/2018 |
| WO | 2021/024181 | A1 | 2/2021 |

OTHER PUBLICATIONS

JP Office Action Mailed on Apr. 3, 2025 for JP Application No. 2023537236, 4 page(s).

Belleza, Irish E., "Burj Khalifa: Towering challenge for builders", Gulf News, Jan. 4, 2010, retrieved from <https://gulfnews.com/business/property/burj-khalifa-towering-challenge-for-builders-1.561802> on Oct. 28, 2016.

(56) References Cited

OTHER PUBLICATIONS

Bocanegra, R., et al., “Multiple electrosprays emitted from an array of holes”, Journal of Aerosol Science, Dec. 2005, pp. 1387-1399, vol. 36, No. 12, Elsevier Ltd., UK.
Cai, Yufeng, et al., “Energy-efficient desalination by forward osmosis using responsive ionic liquid draw solutes”, Environmental Science Water Research & Technology, Feb. 11, 2015, pp. 341-347, retrieved from the Internet at https://pubs.rsc.org/en/content/articlepdf/2015/ew/c4ew00073k on Sep. 30, 2023.
Castell, Dominic C., et al., “Crystal Engineering of Two Light and Pressure Responsive Physisorbents”, Angewandte Chemie International Edition, Mar. 2023, 7 pages, vol. 62, Wiley-VCH GmbH, Germany.
Chen, Zhihui, et al., “Recent progress on sorption/desorption-based atmospheric water harvesting powered by solar energy”, Solar Energy Materials and Solar Cells, Jun. 18, 2021, 19 pages, vol. 230, No. 111233, Elsevier BV, NL.
Dumitran, L. M., et al., “Experimental Study of Air Dehumidification in an Electrostatic Wire-Cylinder Condenser”, Proceedings of the 10th International Symposium on Advanced Topics in Electrical Engineering, Mar. 23-25, 2017, pp. 440-443, Bucharest, Romania, IEEE.
Eole Water, “Our Products: Range of Water Generators”, Jan. 7, 2011 to Sep. 17, 2017, Internet Archive <https://web.archive.org/web/*/http://www.eolewater.com/gb/our-products/range.html>, 6 pages, retrieved Mar. 22, 2018.
Gido, Ben, et al., “Liquid-Desiccant Vapor Separation Reduces the Energy Requirements of Atmospheric Moisture Harvesting”, Environmental Science & Technology, Jul. 20, 2016, pp. 8362-8367, vol. 50, ACS Publications, US.
Ink used to print paper-thin solar panels. University of Newcastle, YouTube, <https://www.youtube.com/watch?v=KhpCXTp736Y&feature=youtu.be>, May 23, 2017.
International Searching Authority, International Search Report and Written Opinion for International Application No. PCT/US2017/067915, dated Apr. 12, 2018, 15 pages, European Patent Office, Netherlands.
IP Australia, Examination Report received for Application No. 2021209303, dated Sep. 9, 2022, 6 pages, Australia.
Liu, Aotian, et al., “Photo-modulated regeneration of hypercrosslinked polymer adsorbents for water treatment,” Separation and Purification Technology, Jan. 15, 2024, (Sep. 22, 2023 (online)), 13 pages, vol. 329, No. 125142, Elsevier, B.V., Netherlands.
Nikolayenko, Varvara I., et al., “Guest-Induced Structural Transformations in a Porous Halogen-Bonded Framework”, Angewandte Chemie International Edition, Jul. 2018, pp. 12086-12091, vol. 57, Wiley-VCH Verlag GmbH& Co. KGaA, Germany.
Outgoing—ISA/210—International Search Report and Written Opinion Mailed on Aug. 1, 2023 for WO Application No. PCT/US23/022886, 9 page(s).
Outgoing—ISA/210—International Search Report and Written Opinion Mailed on Jul. 11, 2022 for WO Application No. PCT/US22/019491, 8 page(s).
Outgoing—ISA/210—International Search Report and Written Opinion Mailed on Mar. 22, 2022 for WO Application No. PCT/US21/072930, 9 page(s).
Owens, J. S., “Salt Crystals as Nuclei of Sea Fog Particles”, Nature, Jun. 2, 1928, p. 866, vol. 121, No. 866, retrieved from the Internet at https://www.nature.com/articles/121866c0 on Sep. 30, 2023.
Parhizkar, M. et al., “Performance of novel high throughput multi electrospray systems for forming of polymeric microlnanoparticles”, Materials & Design, Apr. 9, 2017, pp. 73-84, vol. 126, Elsevier Ltd., UK.
Peeters, Robin, et al., “Fresh water production from atmospheric air: Technology and innovation outlook”, iScience, Nov. 19, 2021, vol. 24, No. 103266, retrieved from the Internet at https://www.researchgate.net/publication/355434143_Fresh_Water_Production_from_Atmospheric_air_Technology_and_Innovation_Outlook/link/64135bf792cfd54f8406502c/download on Sep. 30, 2023, 19 pages.
Reznikov, M., et al., “Electrically enhanced harvesting of water vapor from the air”, Proceedings of 2015 ESA Annual Meeting on Electrostatics, retrieved from the Internet at http://www.electrostatics.org/images/ESA_20I5_F5_Reznikov.pdf on Sep. 30, 2023, 11 pages.
Reznikov, Michael, et al., “Further Progress in the Electrostatic Nucleation of Water Vapor”, IEEE Transactions on Industry Applications, Jan./Feb. 2018 (date of first publication Sep. 20, 2017), pp. 591-598, vol. 54, No. 1, IEEE, US.
Salazar, Manuel Gallardo, et al., “Electrospray technique to produce fine sprays of desiccant liquids. Application to moisture removal from air,” Energy and Buildings, Mar. 1, 2018, pp. 187-197, vol. 162, Elsevier B.V., NL.
Semiat, Raphael, “Energy Issues in Desalination Processes”, Environmental Science & Technology, Oct. 22, 2008, pp. 8193-8201, vol. 42, No. 22,ACS Publications, US.
Snowden, Scott, “Solar Power Stations in Space Could Supply the World With Limitless Energy”, Mar. 12, 2019, retrieved from https://www.forbes.com/sites/scottsnowden/2019/03/12/solar-power-stations-in-space-could-supply-the-world-with-limitless-energy/ on Apr. 15, 2020, 5 pages.
Tang, K. et al. “Generation by electrospray of monodisperse water droplets for targeted drug delivery by inhalation”, Journal of Aerosol Science, Sep. 1994, pp. 1237-1249, vol. 26, No. 6, Elsevier Science Ltd., UK.
The solar cell that is transparent like glass. Keynote Prof. Richard Lunt at BMW Welcomes., YouTube, <https://www.youtube.com/watch?v=5Vx59VLc98E&feature= youtu.be>, Nov. 26, 2015.
U.S. Appl. No. for “Modulating Object Signatures Through The Use of Photosensitive Sorbent Coatings”, unpublished (filed Dec. 13, 2023), Kurt Francis (Inventor), Genesis Systems LLC (Assignee), U.S. Appl. No. 18/538,696.
U.S. Patent and Trademark Office, Office Action received for U.S. Appl. No. 16/782,808, dated Nov. 2, 2020, 16 pages.
U.S. Appl. No. for “Artificially Intelligent Atmospheric Water Generation System Control”, Unpublished (filed Feb. 2, 2024), David Stuckenberg (Inventor), Genesis Systems LLC (Assignee), U.S. Appl. No. 18/431,011.
United States Patent and Trademark Office, Office Action for U.S. Appl. No. 15/850,870, dated Jul. 30, 2019, 12 pages, U.S.
Wikipedia Contributors, “Air Well (Condenser)”, Wikipedia, The Free Encyclopedia, Wikimedia Foundation, Inc., last modified Oct. 17, 2016, retrieved from <https://en.wikipedia.org/wiki/Air_well_(condenser)> on Oct. 28, 2016.
Wood, Daniel, “Space-Based Solar Power”, U.S. Department of Energy, Mar. 6, 2014, retrieved from https://www.energy.gov/articles/space-based-solar-power on Apr. 15, 2020, 6 pages, U.S.
www.solarclothsystem.com, Jan. 17, 2017 to May 17, 2017, Internet Achieve, retrieved from https://web.archive.org/web/20170517094053/https://www.solarclothsystem.com/technology on Apr. 15, 2020, 4 pages.
Extended European Search Report Mailed on Jun. 5, 2025 for EP Application No. 24221383, 9 page(s).
Lekouch, Imad, et al., “Rooftop dew, fog and rain collection in southwest Morocco and predictive dew modeling using neural networks”, Journal of Hydrology, Apr. 13, 2012 (available online), pp. 60-72, vol. 448-449, Elsevier BV, Netherlands.
Final Rejection Mailed on Jul. 9, 2025 for U.S. Appl. No. 17/690,550, 34 page(s).
Non-Final Rejection Mailed on Jan. 28, 2025 for U.S. Appl. No. 17/690,550, 26 page(s).
English Translation of SA Office Action Mailed on Nov. 6, 2025 for SA Application No. 523450550, 9 page(s).
SA Office Action Mailed on Nov. 6, 2025 for SA Application No. 523450550, 9 page(s).
English Translation of JP Office Action, including Search Report dated Jul. 29, 2024 for JP Application No. 2023537236, 21 page(s).
JP Office Action, including Search Report Mailed on Jul. 29, 2024 for JP Application No. 2023537236, 16 page(s).
Non-Final Rejection Mailed on Jul. 19, 2024 for U.S. Appl. No. 17/552,173, 9 page(s).
Non-Final Rejection Mailed on Jul. 19, 2024 for U.S. Appl. No. 18/179,750, 10 page(s).

(56) References Cited

OTHER PUBLICATIONS

EP Office Action Mailed on Aug. 12, 2025 for EP Application No. 21851936, 8 page(s).
Prasad, B. G. Shiva, "Effect of Liquid on a Reciprocating Compressor", Journal of Energy Resources Technology, published online Aug. 6, 2002, pp. 187-190, vol. 124, No. 3, The American Society of Mechanical Engineers, US.

* cited by examiner

*Formula I:*

$R^{a-f}$ = alkyl, cycloalkyl, heteroalkyl, heterocycloalky, aryl, heteroaryl, halo, haloalkyl

*Formula Ia:* ring-open ring-close

$R^{a-d}$ = hydrogen, alkyl, cycloalkyl, heteroalkyl, heterocycloalky, aryl, heteroaryl, halo, haloalkyl X = hydrogen, fluorine, chlorine, nitro

*Formula II:*

*spirobenzopyran*
ring-closed

*merocyanine*
ring-open

$R^{a-m}$ = hydrogen, alkyl, cycloalkyl, heteroalkyl, heterocycloalkyl, aryl, heteroaryl, halo, haloalkyl, nitro Formula III:

ring-open ring-closed

X = O, S, $NR^g$, CH=CH
$R^{a-g}$ = hydrogen, alkyl, cycloalkyl, heteroalkyl, heterocycloalkyl, aryl, heteroaryl, halo, haloalkyl, nitro

*Formula IV:*

***trans*-azobenzene *cis*-azobenzene**

$R^{a-j}$ = hydrogen, alkyl, cycloalkyl, heteroalkyl, heterocycloalkyl, aryl, heteroaryl, halo, haloalkyl, nitro

*Dicarboxylate Bridging Ligands:*

2,5-diphenylbenzene-1,4-dicarboxylic acid ($H_2DPT$)

2,5-di-(4-fluorophenyl)benzene-1,4-dicarboxylic acid ($H_2FDPT$)

*Dipyridine Bridging Ligands:*

$R^a$-$R^h$ = hydrogen, alkyl, cycloalkyl, heteroalkyl, aryl, heteroaryl, halo, haloalkyl, nitro

Desorption Step

Light Source

Transition from
State 1 to State 2

Solid Sorbant
Material

Water

Adsorption Step

Dry Air

Solid Sorbant
Material

Water Vapor + Air

Regeneration Step

Light Source

Transition from
State 2 to State 1

Solid Sorbant
Material

CONCENTRATION OF CHEMICAL SPECIES THROUGH THE USE OF PHOTOSENSTIVE SORBENT MATERIALS

BACKGROUND

The amount of freshwater available for human consumption, plant irrigation, livestock and herd sustenance, commercial and/or industrial usage, and other purposes has generally been overtaken by the amount of freshwater needed for such purposes. Particularly in arid climates characterized by minimal annual rainfall and without access to other freshwater sources, maintaining an adequate amount of water for human and/or animal consumption and usage has become increasingly expensive in recent years. Processes such as desalination, water filtration and/or purification, groundwater (e.g., aquifer) exploitation, and other processes are often used in combination to supply freshwater to various geographical regions, depending on the relative availability and expense of each water sourcing process.

Water shortages in certain geographical regions are also at least partially responsible for food shortages in certain areas of the globe as well. Where water is not readily available for crop irrigation and for hydrating livestock, basic nutritional foods may be difficult to cultivate, and may be difficult or expensive to procure in an open market.

Traditional sorption systems, such as those that use desiccants, are limited by slow adsorption kinetics and are energy intensive. Accordingly, a need generally exists for more efficient methods for capturing gases such as water vapor.

BRIEF SUMMARY

Various embodiments provide photosensitive sorbent materials comprising a light-responsive porous coordination network (PCN) that switches between an open phase which is porous and a closed phase which is less porous with a stepped isotherm profile in response to at least one stimulus. Photosensitive sorbent materials comprise a metal, a photosensitive ligand of the metal which is reversibly transformable between two different molecular structures according to a photochemical transformation, and a bridging ligand that coordinates two or more metal atoms. At least a portion of the photosensitive sorbent material is configured to reversibly transform from the open phase to the closed phase upon exposure to at least a first stimulus and transform from the closed phase to the open phase upon exposure to at least a second stimulus. The first stimulus can be light of a first wavelength and the second stimulus can be light of a second wavelength.

Certain embodiments include a dithienylethene as the photosensitive ligand incorporated into the backbone of the photosensitive sorbent material which undergoes a reversible photocyclization reaction between a ring-open structure and a ring-closed structure in response to UV light or visible light exposure. In certain embodiments, the bridging ligand comprises a benzene-1,4-dicarboxylic acid, such as 2,5-diphenylbenzene-1,4-dicarboxylic acid (DPT) or 2,5-di-(4-fluorophenyl)benzene-1,4-dicarboxylic acid (FDPT). In certain embodiments, the metal is cadmium (Cd).

Various embodiments are directed to devices for the concentration of a target chemical species comprising the photosensitive sorbent materials. The photosensitive sorbent materials may be disposed on a solid substrate and the photosensitive sorbent material can adsorb the target chemical species when in an open phase. The device for the concentration of target chemical species comprises a body housing the photosensitive sorbent material, an inflow conduit to direct a feedstock onto the photosensitive sorbent material, and an outflow conduit to direct an effluent away from the photosensitive sorbent material, and a collection apparatus. The device also comprises a first light source within the housing which is configured to emit light of a first wavelength on the photosensitive sorbent material to transform the photosensitive sorbent material into a closed phase to facilitate desorption and collection of the target chemical species. In certain embodiments, the device further comprises a second light source which irradiates light of a second wavelength on the photosensitive sorbent material to transform the photosensitive material from the closed phase back to the open phase to allow for repeated cycles of adsorption and desorption. In other embodiments, the first light source is configured to emit both light of first wavelength and light of a second wavelength. In certain embodiments, the light of a first wavelength is between 100 nm and 400 nm. In certain embodiments, the light of the second wavelength is between 400 nm and 800 nm.

Certain embodiments include devices for the concentration of a target chemical species with a solid substrate on which the photosensitive sorbent material is dispose that is a flat surface or a curved surface. In certain embodiments, the device comprises two or more solid substrates which are arranged in layers. In certain embodiments, the solid substrate is a flat surface, and two or more substrate surfaces are stacked with gaps between the two or more solid substrates. In certain embodiments, the solid substrate is circular or cylindrical. In certain embodiments, the device further comprises a support core and the solid substrate is a sheet wrapped in a spiral pattern around the support core with a gap between surfaces of the solid substrate. In other embodiments, the device comprises the solid substrate in a corrugated pattern with gaps between the surfaces of the solid substrate. In certain embodiments, the device is configured to move the photosensitive sorbent material from a first position exposed to the collection apparatus to a second position and the light source emits of light of the first wavelength onto the photosensitive sorbent material positioned in the first position and light of the second wavelength in the second position. In certain embodiments, the device comprises a rotatable wheel with the photosensitive sorbent material disposed on the solid substrate and light of the first wavelength is irradiated on the first position of the wheel to desorb and collect the target chemical species, light of the second wavelength is irradiated on the second position of the wheel to regenerate the open phase of the photosensitive sorbent material, and a third position of the wheel is exposed to the inflow and outflow conduits to allow for adsorption of the target chemical species.

Certain embodiments include devices for the collection of a target chemical species from a feedstock that is a gaseous stream or a liquid stream. In certain embodiments, the target chemical species captured by the device is selected from the group consisting of carbon dioxide, hydrogen sulfide, water vapor, nitrogen, oxygen, hydrogen, acetylene, methane, propane, and argon from a gaseous stream. In other embodiments, the target chemical species is a metal ion, such as silver, gold, uranium, lithium ions which is collected from a liquid feedstock using the device.

Various embodiments include devices comprising a pressure chamber which is configured to increase and/or decrease the pressure of the photosensitive sorbent material to above and/or below atmospheric pressure to facilitate the adsorption and/or desorption of the target chemical species.

Certain embodiments include devices which are configured to heat and/or cool all of part of the photosensitive sorbent material to facilitate the adsorption and/or desorption of the target chemical species.

Certain embodiments include devices comprising a first photosensitive sorbent material to capture a first target chemical species and a second photosensitive sorbent material to capture a second target chemical species. The metal and/or photosensitive ligand and/or bridging ligand of the two photosensitive sorbent materials may be different for optimal adsorption of each target chemical species.

Various embodiments provide methods for concentrating a target chemical species by capturing a feedstock with the inflow unit and directing it to the photosensitive sorbent material in the open phase for adsorption of the target chemical species, irradiating the photosensitive sorbent material with light of the first wavelength to transform it to the closed phase, collecting the target chemical species released in the collection apparatus and directing an effluent to the outflow unit. Certain embodiments involve irradiating the photosensitive sorbent material that has desorbed the target chemical species with light of the second wavelength to transform the photosensitive sorbent material back to the open phase. In certain embodiments, the method comprises cooling all or part of the photosensitive sorbent material during adsorption. In certain embodiments, the method comprises heating all of part of the photosensitive sorbent material during desorption. In certain embodiments, the method comprises increasing the pressure of all of part of the photosensitive sorbent material during adsorption. In certain embodiments, the method comprises decreasing the pressure of all of part of the photosensitive sorbent material during desorption.

Certain embodiments include methods of isolating two or more different target chemical species by using a first photosensitive sorbent material to capture a first target chemical species and a second photosensitive sorbent material to capture a second target chemical species. In certain embodiments, separate feedstocks are directed to the first photosensitive sorbent material and the second photosensitive sorbent material. In other embodiments, the feedstock is directed to a first photosensitive sorbent material to collect the first target chemical species, and the effluent from the first photosensitive sorbent material is directed to a second photosensitive sorbent material to collect the second target chemical species.

Certain embodiments provide atmospheric water generation systems and processes by collecting water vapor from source air with the device comprising the photosensitive sorbent material. Certain embodiments provide carbon dioxide capture systems and processes to lower the carbon dioxide concentration within atmospheric air by using the device comprising the photosensitive sorbent material to collect carbon dioxide. In certain embodiments both atmospheric water and carbon dioxide are captured with the device comprise a photosensitive sorbent material.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

Figure 1B:
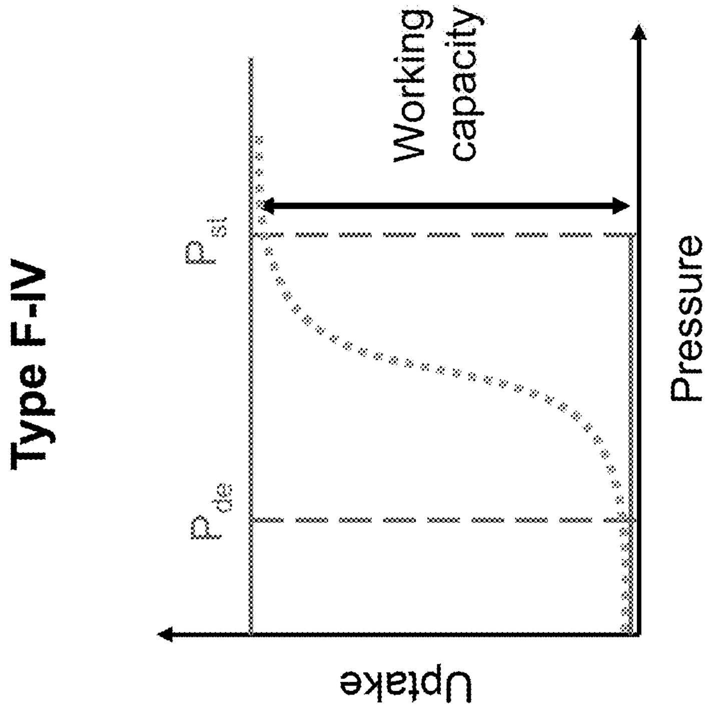
FIGS. 1A-1B show gas sorption isotherm profiles for different types of sorbents.

State-of-the-art gas storage and delivery technologies are energy intensive, creating a need for alternative approaches which offer lower energy footprints. Physisorption by stimuli-responsive porous coordination networks (PCNs) that switch between closed (non-porous) and open (porous) phases represents an emerging field of study that offers promise in this context. Unlike most rigid PCNs with Type I gas sorption isotherm profiles (FIG. 1A), such PCNs can exhibit isotherms that we refer to herein as Type F-IV isotherms (FIG. 1B) which can offer working capacities equal to total uptake if the step occurs between the desired loading and delivery pressures.

Photo-responsive molecules can undergo structural transformations induced by photon absorption (i.e. a molecular switch) between closed and open phases and offer potential utility in light modulated adsorbents (LMAs) such as PCNs. However, many LMAs are not stable in both the open and closed phases. One of the open phase or the closed phase is the excited state and the other of the open phase or the closed phase is the ground state of certain LMAs. Those LMAs tend to spontaneously undergo thermal isomerization from the excited state back to their ground states. However, certain materials, including bis-3-thienylcyclopentenes (BTCPs), when irradiated by ultraviolet (UV) light, can undergo photocyclization (concomitant with a color change from colorless to blue) in the solid-state to yield thermally stable ring closed isomers. Cycloreversion (to the ring open form) may be induced by exposure to light of a higher wavelength, and certain materials demonstrate relatively high thermal stability and solid-state fatigue resistance of both isomers.

Light-responsive components may be incorporated into PCNs of LMAs and may translate the isomerization of photoactive molecules into changes in the macroscopic properties of the bulk molecular solid. In particular, the remote control and photo-switching of gas adsorption in solid sorbents enhances kinetics while decreasing the energy needed for cycling.

Strategic crystal engineering design approaches to control the switching behavior of light modulated adsorbents (LMA) having PCNs are described. The resulting materials discussed herein are photosensitive sorbent materials (e.g., LMAs) comprising organic linkers connected by inorganic nodes and can switch between an open (porous) phase and a closed (non-porous) phase. In the open phase, the photosensitive sorbent material has guest sites (e.g., pores) to allow for the physisorption of a target chemical species (e.g., water vapor, carbon dioxide, or other chemical species) involving weak intermolecular attractive forces such as van der Waals, ion-dipole, hydrogen bonding, and dipole-dipole forces. Upon transforming to the closed phase, the photosensitive sorbent material takes on a contracted structure with reduced pore size and without guest sites for physisorption of the target chemical species and is less able to adsorb the target chemical species. Thus, a photosensitive sorbent material can be controllably switched between a porous phase for the adsorption of a target chemical species and a less porous phase for desorption of the target chemical species.

Figure 1A:
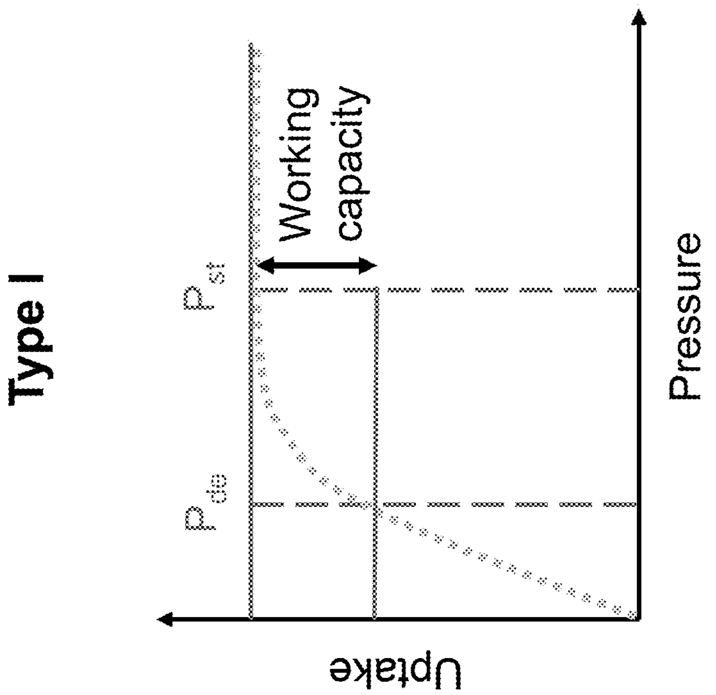

In embodiments, the photosensitive sorbent materials exhibit Type F-IV isotherm profiles, which provide desirable properties for sorption applications and have advantages over existing materials, such as those with Type I isotherm profiles. The delivery pressure ($P_{de}$), storage pressure ($P_{st}$), and uptake of chemical species (y-axis) based on pressure (x-axis) are shown in FIG. 1A for rigid porous sorbents with Type I isotherm profiles and FIG. 1B for flexible switching sorbents with Type F-IV isotherm profiles. The Type F-IV sorbents have a stepped isotherm profile and exhibit a rapid increase in uptake capacity when the pressure is increased beyond a certain threshold, which provides a larger working capacity as compared to Type I sorbents, which have a limited ability to uptake the desired chemical species at operationally useful pressures. Thus, the photosensitive sorbent materials have enhanced kinetics and require less energy for cycling and operation than previously known sorbent materials.

Figure 2A:
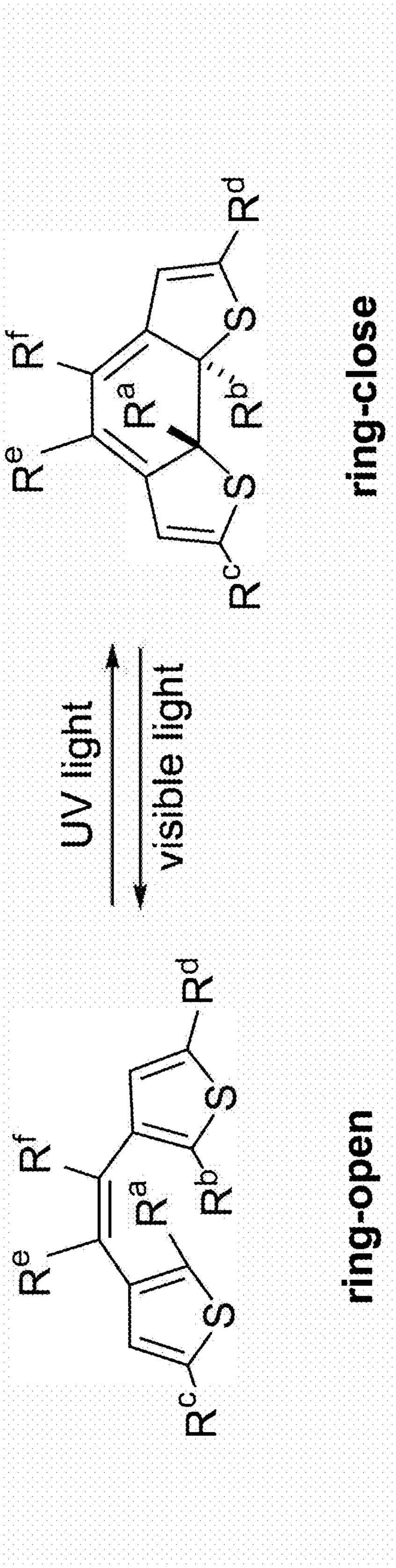
FIGS. 2A-2D show the reversible photocyclization of dithienylethene (2A), bis-3-thienylcyclopentene (2B), spirobenzopyran (2C), and fulgide (2D) derivatives.

In certain embodiments, the photosensitive sorbent material switches between an open phase and a closed phase in response to one or more stimuli for adsorption and desorption. In certain embodiments, the stimuli comprise pressure, temperature, and/or light. As a specific example, the stimulus is the application of light of a defined wavelength to cause transformation between the open phase and the closed phase or a defined wavelength to cause transformation between the closed phase and the open phase. The photosensitive sorbent material comprises a photosensitive ligand configured to undergo a structural transformation induced by photon absorption to act as a molecular switch when exposed to the one or more stimuli. In certain embodiments, the photosensitive ligand undergoes a reversible photocyclization reaction and is converted between a ring-open structure (i.e., the open phase) and a ring-closed structure (i.e., the closed phase) by exposure to light of a certain wavelength. In certain embodiments, the photosensitive ligand is a dithienylethene derivative (Formula I) which cyclizes from the ring-open structure to the ring-closed structure upon UV light exposure and is converted back to the ring-open structure upon visible light exposure as shown in FIG. 2A.

Figure 3:
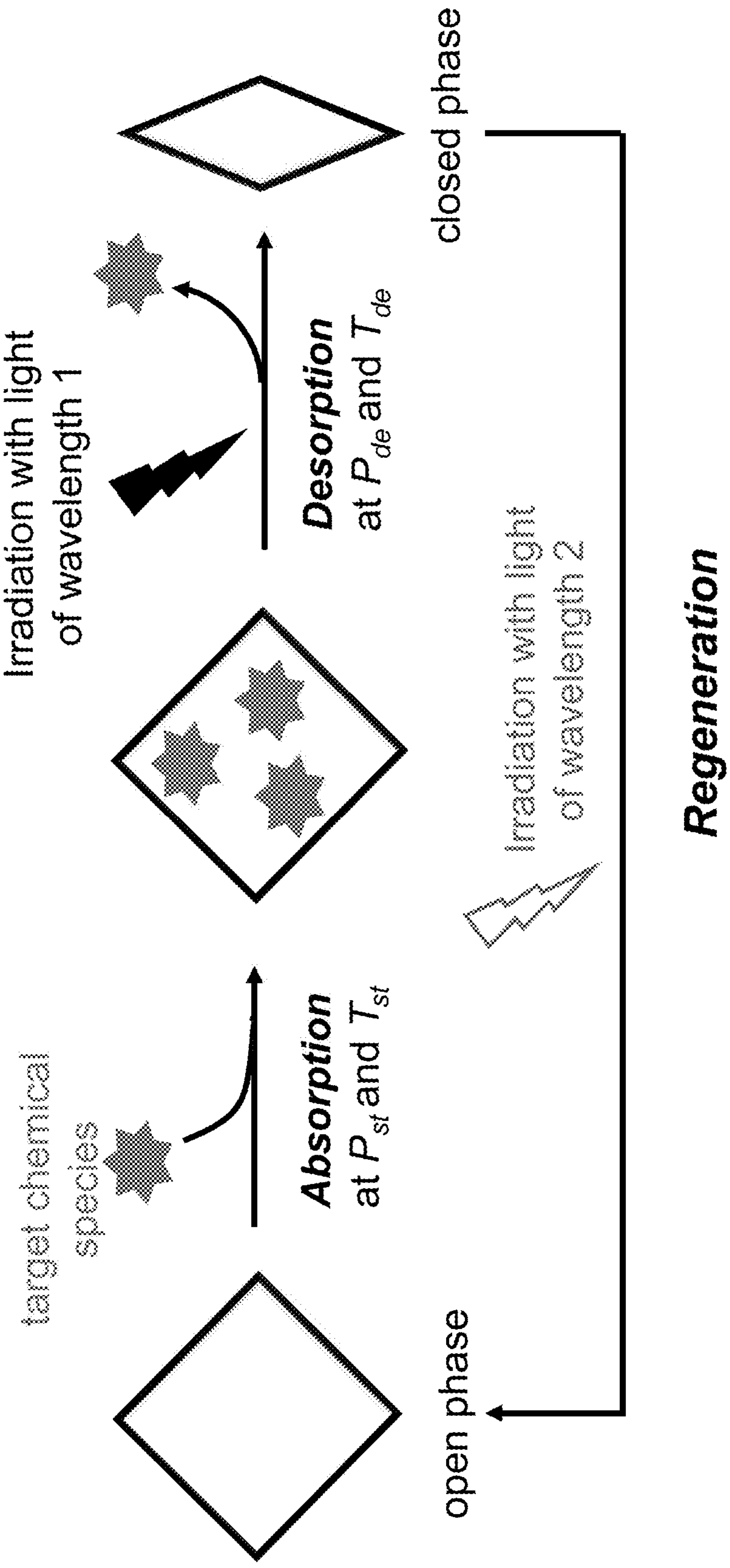
FIG. 3 shows the conversion of a photosensitive sorbent material between an open phase and a closed phase for the adsorption and desorption of a target chemical species.

In certain embodiments, the structural transformation of the photosensitive ligand is used to convert the photosensitive sorbent material between the open phase for adsorption and the closed phase for desorption. FIG. 3 shows a photosensitive sorbent material in an open phase with guest sites which undergoes an adsorption step upon exposure to a target chemical species, followed by irradiation with light of a first wavelength to undergo a desorption step by converting the photosensitive sorbent material into a closed phase without guest sites, thereby releasing the target chemical species. After desorption, the photosensitive sorbent material in the closed phase can undergo a regeneration step by irradiation with light of a second wavelength to be converted back to the open phase. Light of the second wavelength may comprise a range of wavelengths including the second wavelength and omitting the first wavelength used to convert the photosensitive sorbent material to the closed phase. Similarly, the above discussion of irradiating the material with the light of the first wavelength may comprise irradiating the photosensitive sorbent material with light of a range of wavelengths including the first wavelength and omitting light in the second wavelength. In certain embodiments, the pressure and/or temperature is also modulated for adsorption and desorption.

In certain embodiments, a device for collecting a target chemical species from a feedstock uses the photosensitive sorbent material configured for conversion between an open phase to adsorb the target chemical species and a closed phase to desorb and collect the target chemical species. In certain embodiments, the photosensitive sorbent material is used to collect water vapor and/or carbon dioxide from atmospheric air.

Photosensitive Sorbent Materials

The photosensitive sorbent materials disclosed herein are solid materials capable of selectively adsorbing a target chemical species while in the open phase and desorbing the target chemical species while in the closed phase in response to stimuli such as light of a particular wavelength, pressure changes across a threshold pressure, and/or temperature changes across a threshold temperature. The photosensitive sorbent materials comprise a light-responsive PCN with a Type F-IV stepped isotherm profile which switches from an open phase to a closed phase with a high working capacity for adsorbing and desorbing the target chemical species.

In certain embodiments, the photosensitive sorbent material changes color upon undergoing the light-induced structural transformation. In certain embodiments, the photosensitive material is white or colorless when the photosensitive ligand has a ring-opened structure and blue when the photosensitive ligand has the ring-closed structure.

The photosensitive sorbent material may be capable of repeated cycling between the open and closed phases with minimal to no loss in performance (e.g., ability to adsorb and desorb a target chemical species) after repeated cycles of adsorption and desorption.

The light-responsive PCN is composed of molecular building blocks which comprise organic linkers connected by inorganic nodes. Each molecular building block of the light-responsive PCN comprising the photosensitive sorbent material comprises one or more metal atoms, one or more photosensitive ligands, and one or more bridging ligands. In certain embodiments, the metal atom is selected from the group consisting of Ag, Ca, K, Zn, Na, Pb, Mn, Fe, Co, Ni, Al, Cu, Sn, Cd, Hg, Cr, Fe, Bi, Ga, Ge, Au, In, Tl, Rb, Cs, As, Sb, Cr, Zn, V, Pt, Pd, and Rh. In certain embodiments, the metal atom is Cd. In certain embodiments, the photosensitive sorbent material comprises two or more metals.

The photosensitive ligand coordinates the metal and is incorporated into the backbone of the PCN. The photosensitive ligand undergoes a reversible photochemical transformation between two different molecular structures (e.g., a ring-open structure and a ring-closed structure) upon photon absorption. In certain embodiments, the photosensitive ligand undergoes a photocyclization reaction involving a ring-closing reaction at a first wavelength of light and a ring-opening reaction at a second wavelength of light.

In certain embodiments, the photosensitive ligand is a dithienylethene. In certain embodiments, the dithienylethene has the structure shown in Formula I in FIG. 2A. In certain embodiments, Ra and Rb are methyl (—$CH_3$) groups. In certain embodiments, $R^c$ and $R^d$ are alkyl, cycloalkyl, heteroalkyl, aryl, or heteroaryl groups. In certain embodiments, $R^c$ and $R^d$ are heteroaryl groups, such as pyridine, quinoline, or isoquinoline. In certain embodiments, $R^c$ and $R^d$ are 4-pyridyl groups.

Figure 2B:
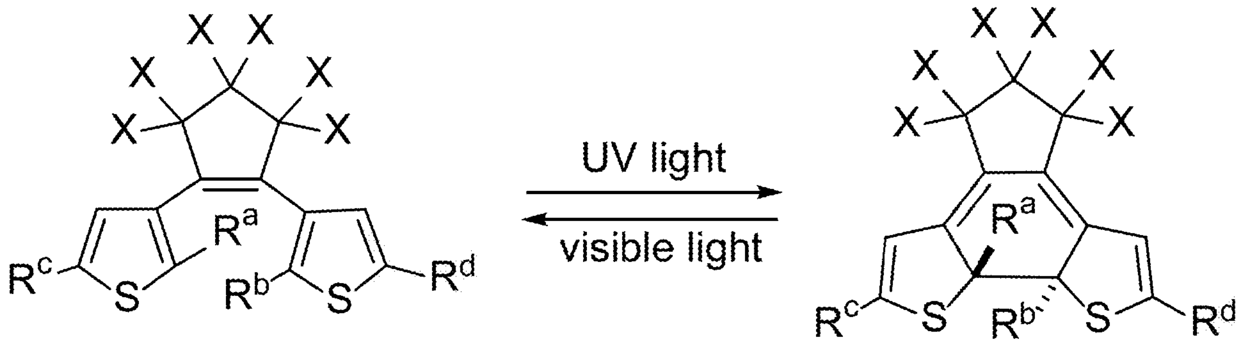

In certain embodiments the dithienylethene is a bis-3-thienylcyclopentene and has a structure shown in Formula Ia as shown in FIG. 2B. In certain embodiments, X is hydrogen or a halogen. In certain embodiments, X is fluorine and the bis-3-thienylcyclopentene derivative is a bis-3-thienylperfluorocyclopentene. Bis-3-thienylperfluorocyclopentenes undergo the ring closing reaction shown in Formula Ia when exposed to UV light, optimally of a wavelength of 365 nm and undergo a ring opening when exposed to visible light, optimally of a wavelength of 532 nm. In certain embodiments, the bis-3-thienylperfluorocyclopentene is 1,2-bis[2-methyl-5-(4-pyridyl)-3-thienyl]perfluorocyclopentene (BTCP).

Figure 2C:
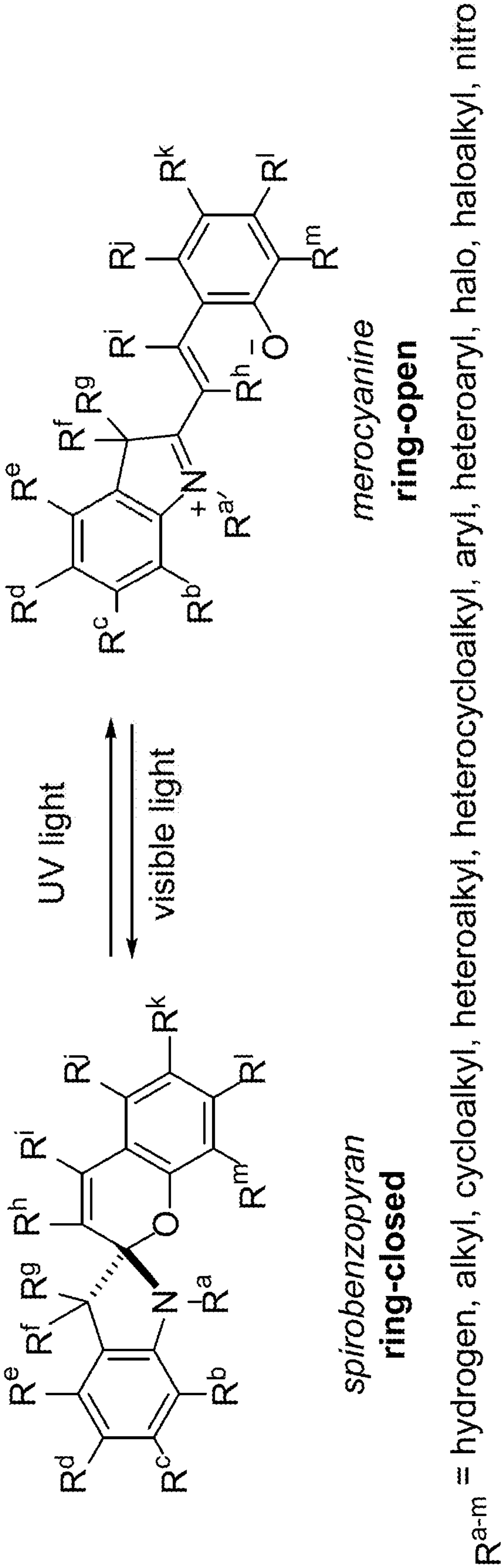

In certain embodiments, the photosensitive ligand comprises a spirobenzopyran which can undergo ring-opening to form a merocyanine. In certain embodiments, the photosensitive ligand comprises a structure shown in Formula II as shown in FIG. 2C.

Figure 2D:
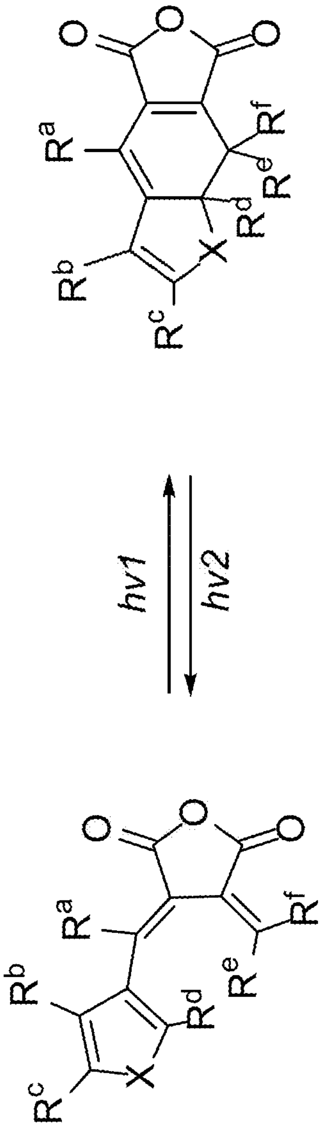

In certain embodiments, the photosensitive ligand is a fulgide. In certain embodiments, the fulgide comprises a structure shown in Formula III as shown in FIG. 2D.

Figure 2E:
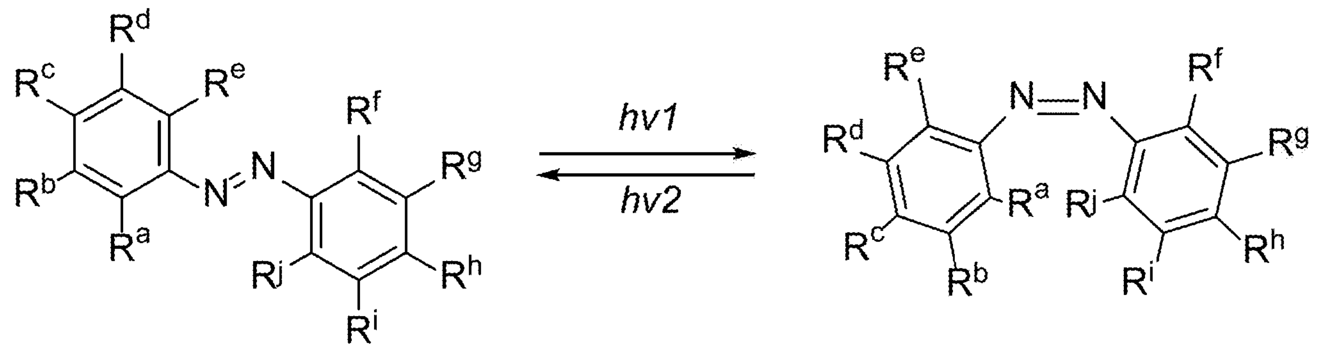
FIG. 2E shows the trans-cis photoisomerization of an azobenzene.

In other embodiments, the photosensitive ligand undergoes a photoisomerization reaction, such as a cis-trans isomerization. In certain embodiments, the photosensitive ligand comprises an azobenzene derivative. In certain embodiments, the azobenzene has a structure shown in Formula IV as shown in FIG. 2E.

Figure 2F:
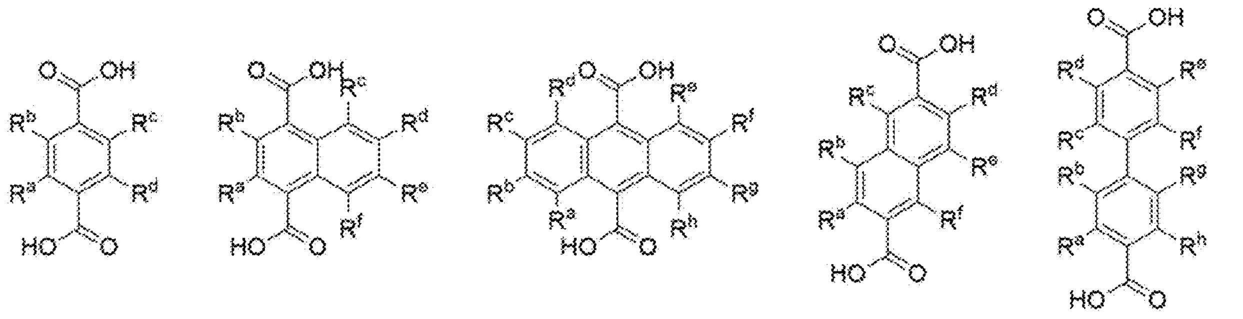
FIG. 2F shows representative examples of dicarboxylate and dipyridine bridging ligands.
Figure 2F:
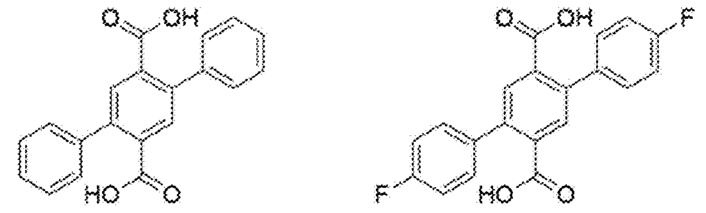
Figure 2F:
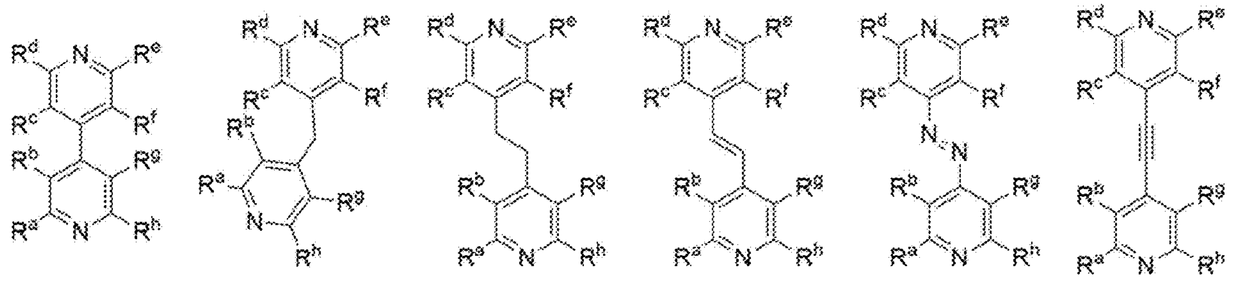

Each molecular building block of the light-responsive PCN comprises one or more bridging ligands that coordinates to two or more metal atoms. The bridging ligand may coordinate to the metal atom with one or more oxygen atoms or one or more nitrogen atoms. In certain embodiments, each molecular building block of the light-responsive PCN comprises two bridging ligands for each metal atom. In certain embodiments, the bridging ligand is a dicarboxylate and each carboxylate group coordinates one metal atom. In certain embodiments, the bridging ligand is a benzene-1,4-dicarboxylate derivative. In certain embodiments, the bridging ligand is a 2,5-diarylbenzene-1,4-dicarboxylate. In certain embodiments, the bridging ligand is 2,5-diphenylbenzene-1,4-dicarboxylate (DPT). In certain embodiments, the bridging ligand is 2,5-di-(4-fluorophenyl) benzene-1,4-dicarboxylate (FDPT). In other embodiments, the bridging ligand is a diamine. In certain embodiments, the bridging ligand comprises two or more pyridines. In certain embodiments, the bridging ligand has a structure shown in FIG. 2F.

The photosensitive ligands and bridging ligands described above may contain one or more substituents, shown as R groups. The photosensitive sorbent materials may contain photosensitive ligands and/or bridging ligands with one or more substituents (e.g., R groups) comprising alkyl, cycloalkyl, heteroalkyl, heterocyclyl, haloalkyl, perfluoroalkyl, alkenyl, heteroalkenyl, aryl, heteroaryl, aralkyl, hydroxyl, oxo, carboxyl, thiol, sulfoxide, sulfone, sulfonyl, sulfonamide, amino, amide, nitrile, nitro, azido, and/or halo groups.

When a substituent is specified to be "a bond" the groups that are immediately adjacent to the specified substituent are directly connected to each other in a chemically feasible bonding configuration. All chiral, diastereomeric, racemic forms of a structure are intended, unless a particular stereochemistry or isomeric form is specifically indicated. Compounds described herein can include enriched or resolved optical isomers at any or all asymmetric atoms as are apparent from the depictions, at any degree of enrichment. Both racemic and diastereomeric mixtures, as well as the individual optical isomers can be isolated or synthesized so as to be substantially free of their enantiomeric or diastereomeric partners.

In general, "substituted" refers to an organic group as defined herein in which one or more bonds to a hydrogen atom contained therein are replaced by one or more bonds to a non-hydrogen atom such as, but not limited to, a halogen (i.e., F, Cl, Br, and I); an oxygen atom in groups such as hydroxyl groups, alkoxy groups, aryloxy groups, aralkyloxy groups, oxo (carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR', OC(O)N(R')$_2$, CN, NO, $NO_2$, $ONO_2$, azido, $CF_3$, $OCF_3$, R', O (oxo), S (thiono), C(O), S(O), methylenedioxy, ethylenedioxy, N(R')$_2$, SR', SOR', $SO_2$R', $SO_2$N(R')$_2$, $SO_3$R', C(O)R', C(O)C(O)R', C(O)$CH_2$C(O)R', C(S)R', C(O)OR', OC(O)R', C(O)N(R')$_2$, OC(O)N(R')$_2$, C(S)N(R')$_2$, ($CH_2$)$_{0-2}$N(R')C(O)R', ($CH_2$)$_{0-2}$N(R')N(R')$_2$, N(R')N(R')C(O)R', N(R')N(R')C(O)OR', N(R')N(R')CON(R')$_2$, N(R')$SO_2$R', N(R')$SO_2$N(R')$_2$, N(R')C(O)OR', N(R')C(O)R', N(R')C(S)R', N(R')C(O)N(R')$_2$, N(R')C(S)N(R')$_2$, N(COR')COR', N(OR')R', C(═NH)N(R')$_2$, C(O)N(OR')R', or C (═NOR') R' wherein R' can be hydrogen or a carbon-based moiety, and wherein the carbon-based moiety can itself be further substituted.

When a substituent is monovalent, such as, for example, F or Cl, it is bonded to the atom it is substituting by a single bond. When a substituent is more than monovalent, such as O, which is divalent, it can be bonded to the atom it is substituting by more than one bond, i.e., a divalent substituent is bonded by a double bond; for example, a C substituted with O forms a carbonyl group, C═O, which can also be written as "CO", "C(O)", or "C(═O)", wherein the C and the O are double bonded. When a carbon atom is substituted with a double-bonded oxygen (═O) group, the oxygen substituent is termed an "oxo" group. When a divalent substituent such as NR is double-bonded to a carbon atom, the resulting C(═NR) group is termed an "imino" group. When a divalent substituent such as S is double-bonded to a carbon atom, the results C(═S) group is termed a "thiocarbonyl" group.

Alternatively, a divalent substituent such as O, S, C(O), S(O), or $S(O)_2$ can be connected by two single bonds to two different carbon atoms. For example, O, a divalent substituent, can be bonded to each of two adjacent carbon atoms to provide an epoxide group, or the O can form a bridging ether group, termed an "oxy" group, between adjacent or non-adjacent carbon atoms, for example bridging the 1, 4-carbons of a cyclohexyl group to form a [2.2.1]-oxabicyclo system. Further, any substituent can be bonded to a carbon or other atom by a linker, such as $(CH_2)_n$ or $(CR'_2)_n$ wherein n is 1, 2, 3, or more, and each R' is independently selected.

C(O) and $S(O)_2$ groups can be bound to one or two heteroatoms, such as nitrogen, rather than to a carbon atom. For example, when a C(O) group is bound to one carbon and one nitrogen atom, the resulting group is called an "amide" or "carboxamide." When a C(O) group is bound to two nitrogen atoms, the functional group is termed a urea. When a $S(O)_2$ group is bound to one carbon and one nitrogen atom, the resulting unit is termed a "sulfonamide." When a $S(O)_2$ group is bound to two nitrogen atoms, the resulting unit is termed a "sulfamate."

Substituted alkyl, alkenyl, alkynyl, cycloalkyl, and cycloalkenyl groups as well as other substituted groups also include groups in which one or more bonds to a hydrogen atom are replaced by one or more bonds, including double or triple bonds, to a carbon atom, or to a heteroatom such as, but not limited to, oxygen in carbonyl (oxo), carboxyl, ester, amide, imide, urethane, and urea groups; and nitrogen in imines, hydroxyimines, oximes, hydrazones, amidines, guanidines, and nitriles.

Substituted ring groups such as substituted cycloalkyl, aryl, heterocyclyl and heteroaryl groups also include rings and fused ring systems in which a bond to a hydrogen atom is replaced with a bond to a carbon atom. Therefore, substituted cycloalkyl, aryl, heterocyclyl and heteroaryl groups can also be substituted with alkyl, alkenyl, and alkynyl groups as defined herein.

By a "ring system" as the term is used herein is meant a moiety comprising one, two, three or more rings, which can be substituted with non-ring groups or with other ring systems, or both, which can be fully saturated, partially unsaturated, fully unsaturated, or aromatic, and when the ring system includes more than a single ring, the rings can be fused, bridging, or spirocyclic. By "spirocyclic" is meant the class of structures wherein two rings are fused at a single tetrahedral carbon atom, as is well known in the art.

As to any of the groups described herein, which contain one or more substituents, it is understood, of course, that such groups do not contain any substitution or substitution patterns which are sterically impractical and/or synthetically non-feasible. In addition, the compounds of this disclosed subject matter include all stereochemical isomers arising from the substitution of these compounds. Selected substituents within the compounds described herein may be present to a recursive degree. In this context, "recursive substituent" means that a substituent may recite another instance of itself or of another substituent that itself recites the first substituent.

Alkyl groups include straight chain and branched alkyl groups and cycloalkyl groups having from 1 to about 20 carbon atoms, and typically from 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2, 2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed above, for example, amino, hydroxy, cyano, carboxy, nitro, thio, alkoxy, and halogen groups.

The term "alkylene" means a linear saturated divalent hydrocarbon radical of one to six carbon atoms or a branched saturated divalent hydrocarbon radical of one to six carbon atoms unless otherwise stated, such as methylene, ethylene, propylene, 1-methylpropylene, 2-methylpropylene, butylene, pentylene, and the like.

The term "carbonyl" means C═O.

The terms "carboxy" and "hydroxycarbonyl" mean COOH.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphanyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups can be mono-substituted or substituted more than once, such as, but not limited to, 2,2-, 2,3-, 2,4-, 2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

Alkenyl groups include straight and branched chain and cyclic alkyl groups as defined above, except that at least one double bond exists between two carbon atoms. Thus, alkenyl groups have from 2 to about 20 carbon atoms, and typically from 2 to 12 carbons or, in some embodiments, from 2 to 8 carbon atoms.

Alkynyl groups include straight and branched chain alkyl groups, except that at least one triple bond exists between two carbon atoms. Thus, alkynyl groups have from 2 to about 20 carbon atoms, and typically from 2 to 12 carbons or, in some embodiments, from 2 to 8 carbon atoms.

The term "heteroalkyl" by itself or in combination with another term means, unless otherwise stated, a stable straight or branched chain alkyl group consisting of the stated number of carbon atoms and one or two heteroatoms selected from the group consisting of O, N, and S, and wherein the nitrogen and sulfur atoms may be optionally oxidized and the nitrogen heteroatom may be optionally quaternized. The heteroatom(s) may be placed at any position of the heteroalkyl group, including between the rest of the heteroalkyl group and the fragment to which it is attached, as well as attached to the most distal carbon atom in the heteroalkyl group.

A "heterocycloalkyl" ring is a cycloalkyl ring containing at least one heteroatom. A heterocycloalkyl ring can also be termed a "heterocyclyl," described below.

The term "heteroalkenyl" by itself or in combination with another term means, unless otherwise stated, a stable straight or branched chain monounsaturated or di-unsaturated hydrocarbon group consisting of the stated number of carbon atoms and one or two heteroatoms selected from the group consisting of O, N, and S, and wherein the nitrogen and sulfur atoms may optionally be oxidized and the nitrogen heteroatom may optionally be quaternized.

Aryl groups are cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined above. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed above.

Aralkyl groups are alkyl groups as defined above in which a hydrogen or carbon bond of an alkyl group is replaced with a bond to an aryl group as defined above. Representative aralkyl groups include benzyl and phenylethyl groups and fused (cycloalkylaryl) alkyl groups such as 4-ethyl-indanyl. Aralkenyl group are alkenyl groups as defined above in which a hydrogen or carbon bond of an alkyl group is replaced with a bond to an aryl group as defined above.

Heterocyclyl groups or the term "heterocyclyl" includes aromatic and non-aromatic ring compounds containing 3 or more ring members, of which, one or more is a heteroatom such as, but not limited to, N, O, and S. Thus, a heterocyclyl can be a heterocycloalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a $C_2$-heterocyclyl can be a 5-ring with two carbon atoms and three heteroatoms, a 6-ring with two carbon atoms and four heteroatoms and so forth. Likewise, a $C_4$-heterocyclyl can be a 5-ring with one heteroatom, a 6-ring with two heteroatoms, and so forth. The number of carbon atoms plus the number of heteroatoms sums up to equal the total number of ring atoms. A heterocyclyl ring can also include one or more double bonds. A heteroaryl ring is an embodiment of a heterocyclyl group. The phrase "heterocyclyl group" includes fused ring species including those comprising fused aromatic and non-aromatic groups. For example, a dioxolanyl ring and a benzodioxolanyl ring system (methylenedioxyphenyl ring system) are both heterocyclyl groups within the meaning herein. The phrase also includes polycyclic ring systems containing a heteroatom such as, but not limited to, quinuclidyl. Heterocyclyl groups can be unsubstituted or can be substituted as discussed above. Heterocyclyl groups include, but are not limited to, pyrrolidinyl, piperidinyl, piperazinyl, morpholinyl, pyrrolyl, pyrazolyl, triazolyl, tetrazolyl, oxazolyl, isoxazolyl, thiazolyl, pyridinyl, thiophenyl, benzothiophenyl, benzofuranyl, dihydrobenzofuranyl, indolyl, dihydroindolyl, azaindolyl, indazolyl, benzimidazolyl, azabenzimidazolyl, benzoxazolyl, benzothiazolyl, benzothiadiazolyl, imidazopyridinyl, isoxazolopyridinyl, thianaphthalenyl, purinyl, xanthinyl, adeninyl, guaninyl, quinolinyl, isoquinolinyl, tetrahydroquinolinyl, quinoxalinyl, and quinazolinyl groups. Representative substituted heterocyclyl groups can be mono-substituted or substituted more than once, such as, but not limited to, piperidinyl or quinolinyl groups, which are 2-, 3-, 4-, 5-, or 6-substituted, or disubstituted with groups such as those listed above.

Heteroaryl groups are aromatic ring compounds containing 5 or more ring members, of which, one or more is a heteroatom such as, but not limited to, N, O, and S; for instance, heteroaryl rings can have 5 to about 8-12 ring members. A heteroaryl group is a variety of a heterocyclyl group that possesses an aromatic electronic structure. A heteroaryl group designated as a $C_2$-heteroaryl can be a 5-ring with two carbon atoms and three heteroatoms, a 6-ring with two carbon atoms and four heteroatoms and so forth. Likewise a $C_4$-heteroaryl can be a 5-ring with one heteroatom, a 6-ring with two heteroatoms, and so forth. The number of carbon atoms plus the number of heteroatoms sums up to equal the total number of ring atoms. Heteroaryl groups include, but are not limited to, groups such as pyrrolyl, pyrazolyl, triazolyl, tetrazolyl, oxazolyl, thiazolyl, pyridinyl, thiophenyl, benzothiophenyl, benzofuranyl, indolyl, azaindolyl, indazolyl, benzimidazolyl, azabenzimidazolyl, benzoxazolyl, benzothiazolyl, benzothiadiazolyl, imidazopyridinyl, isoxazolopyridinyl, thianaphthalenyl, purinyl, xanthinyl, adeninyl, guaninyl, quinolinyl, isoquinolinyl, tetrahydroquinolinyl, quinoxalinyl, and quinazolinyl groups. Heteroaryl groups can be unsubstituted or can be substituted with groups as is discussed above. Representative substituted heteroaryl groups can be substituted one or more times with groups such as those listed above.

Additional examples of aryl and heteroaryl groups include but are not limited to indenyl, furylxanthenyl, isoindanyl, acridinyl, imidazolyl, triazolyl, oxazolyl pyridyl (2-pyridyl, 3-pyridyl, 4-pyridyl), pyrimidinyl (2-pyrimidinyl, 4-pyrimidinyl, 5-pyrimidinyl, 6-pyrimidinyl), pyrazinyl, pyridazinyl, quinolyl (2-quinolyl, 3-quinolyl, 4-quinolyl, 5-quinolyl, 6-quinolyl, 7-quinolyl, 8-quinolyl), isoquinolyl (1-isoquinolyl, 3-isoquinolyl, 4-isoquinolyl, 5-isoquinolyl, 6-isoquinolyl, 7-isoquinolyl, 8-isoquinolyl), benzo[b]thiophenyl, indazole, carbazolyl and the like.

Heterocyclylalkyl groups are alkyl groups as defined above in which a hydrogen or carbon bond of an alkyl group as defined above is replaced with a bond to a heterocyclyl group as defined above. Representative heterocyclyl alkyl groups include, but are not limited to, furan-2-yl methyl, furan-3-yl methyl, pyridine-3-yl methyl, tetrahydrofuran-2-yl ethyl, and indol-2-yl propyl.

Heteroarylalkyl groups are alkyl groups as defined above in which a hydrogen or carbon bond of an alkyl group is replaced with a bond to a heteroaryl group as defined above.

The term "alkoxy" refers to an oxygen atom connected to an alkyl group, including a cycloalkyl group, as are defined above. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like.

The terms "halo" or "halogen" or "halide" by themselves or as part of another substituent mean, unless otherwise stated, a fluorine, chlorine, bromine, or iodine atom, preferably, fluorine, chlorine, or bromine.

A "haloalkyl" group includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "perfluoroalkyl" means an alkyl, alkenyl, cycloalkyl or cycloalkenyl group wherein all hydrogen atoms are replaced by fluorine atoms.

The terms "aryloxy" and "arylalkoxy" refer to, respectively, an aryl group bonded to an oxygen atom and an aralkyl group bonded to the oxygen atom at the alkyl moiety. Examples include but are not limited to phenoxy, naphthyloxy, and benzyloxy.

The term "amine" includes primary, secondary, and tertiary amines having, e.g., the formula N $(group)_3$ wherein each group can independently be H or non-H, such as alkyl, aryl, and the like. Amines include but are not limited to $R—NH_2$, for example, alkylamines, arylamines, alkylarylamines; $R_2NH$ wherein each R is independently selected, such as dialkylamines, diarylamines, aralkylamines, heterocyclylamines and the like; and $R_3N$ wherein each R is independently selected, such as trialkylamines, dialkylarylamines, alkyldiarylamines, triarylamines, and the like.

An "amino" group is a substituent of the form $—NH_2$, —NHR, $—NR_2$, $—NR_3^+$, wherein each R is independently selected, and protonated forms of each, except for $—NR_3^+$, which cannot be protonated. Accordingly, any compound substituted with an amino group can be viewed as an amine. An "amino group" within the meaning herein can be a primary, secondary, tertiary or quaternary amino group. An "alkylamino" group includes a monoalkylamino, dialkylamino, and trialkylamino group.

The term "amide" (or "amido") includes C- and N-amide groups, i.e., $—C(O)NR_2$, and —NRC(O)R groups, respectively. Amide groups therefore include but are not limited to primary carboxamide groups ($—C(O)NH_2$) and formamide groups (—NHC(O)H). A "carboxamido" or "aminocarbonyl" group is a group of the formula $C(O)NR_2$, wherein R can be H, alkyl, aryl, etc.

The term "azido" refers to an $N_3$ group. An "azide" can be an organic azide. The term "nitro" refers to an $NO_2$ group bonded to an organic moiety.

The term "urethane" ("carbamoyl" or "carbamyl") includes N- and O-urethane groups, i.e., —NRC(O)OR and $—OC(O)NR_2$ groups, respectively.

The term "sulfonamide" (or "sulfonamido") includes S- and N-sulfonamide groups, i.e., $—SO_2NR_2$ and $—NRSO_2R$ groups, respectively. Sulfonamide groups therefore include but are not limited to sulfamoyl groups ($—SO_2NH_2$).

The term "amidine" or "amidino" includes groups of the formula $—C(NR)NR_2$. Typically, an amidino group is $—C(NH)NH_2$.

The term "guanidine" or "guanidino" includes groups of the formula $—NRC(NR)NR_2$. Typically, a guanidino group is $—NHC(NH)NH_2$.

If a value of a variable that is necessarily an integer, e.g., the number of carbon atoms in an alkyl group or the number of substituents on a ring, is described as a range, e.g., 0-4, what is meant is that the value can be any integer between 0 and 4 inclusive, i.e., 0, 1, 2, 3, or 4.

Devices and Methods for the Concentration of a Target Chemical Species

Figure 4:
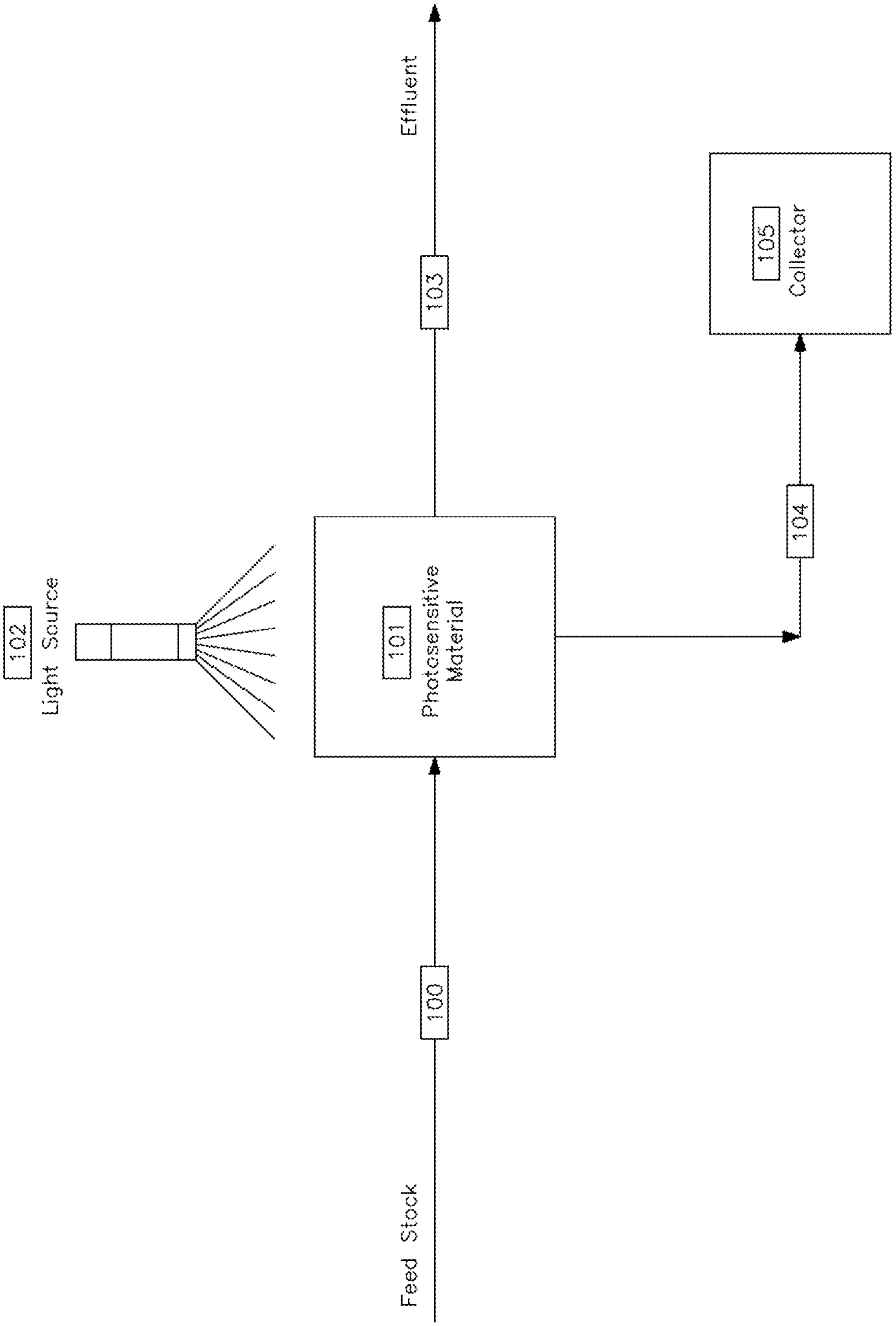
FIG. 4 shows a schematic diagram of a system for the concentration of a target chemical species using a photosensitive sorbent material.

The photosensitive sorbent materials described above are configured to concentrate a target chemical species (e.g., water vapor, carbon dioxide, and/or the like) using devices and methods disclosed herein. As shown in the illustrated embodiment of FIG. 4, a feedstock containing the target chemical species 100 (e.g., atmospheric air) is introduced into a device comprising a photosensitive sorbent material 101 that is in an open phase (e.g., the photosensitive ligand has a ring-open structure) configured for adsorbing the target chemical species from the feedstock. After the target chemical species has been adsorbed by the photosensitive sorbent material, an effluent 103 (the atmospheric air after a percentage of the target chemical species has been removed therefrom) is released/exhausted from the device. As discussed above, the photosensitive sorbent material may be configured to convert between the open phase to a closed phase (by changing the molecular structure of the photosensitive ligand from a ring-open structure to a ring-closed structure) upon exposure to a stimulus, such as exposure to light of a defined wavelength. To facilitate desorption and collection of the target chemical species, the device comprises a light source 102 configured to apply the stimulus by applying light of a particular wavelength (e.g., UV light) to the photosensitive sorbent material 101 containing the adsorbed target chemical species 104. Upon exposure to the stimulus, the photosensitive sorbent material 101 converts to the closed state, thereby releasing the isolated target chemical species 104. The isolated target chemical species 104 may be released to a confined portion of the device, where the isolated target chemical species 104 may be captured in a collector 105.

In certain embodiments, the device applies light of a first wavelength to the photosensitive sorbent material (by the light source) to facilitate desorption and applies light of a second wavelength (by the light source or by a second light source) to the photosensitive sorbent material for a regeneration step to regenerate the open phase. After exposure to light of the second wavelength, the photosensitive sorbent material can again adsorb the target chemical species. In certain embodiments, the light of a second wavelength for the regeneration step has a higher wavelength than the light of a first wavelength for the desorption step.

The device for the concentration of a target chemical species may comprise one or more light sources. In certain embodiments, the device comprises two different light sources which emit light with different wavelengths. In other embodiments, the device comprises one light source which can be switched between two or more modes to emit different wavelengths of light. In certain embodiments, one or more light sources are a light-emitting diode (LED), a compact fluorescent light (CFL) bulb, an incandescent light bulb, ambient light and/or sunlight. In certain embodiments, one or more light sources emit light of a single wavelength. In other embodiments, one or more light sources emit light with a range of wavelengths. In certain embodiments, one or more light sources use a filter to remove undesired wavelengths of light. In embodiments where one or more light sources emit light with a range of wavelengths, the range of wavelengths of light emitted for the desorption step (e.g., to switch from open phase to closed phase) should not overlap with the range of wavelengths of light emitted for the regeneration step (e.g., to switch from closed phase to open phase).

In certain embodiments, the light of the first wavelength emitted by the device for the desorption step is UV light. In certain embodiments, the light of the first wavelength emitted by the device is between 100-400 nm, between 200-400 nm, between 300-400 nm, between 350-400 nm, between 350-375 nm, or between 360-370 nm. In certain embodiments, the light of the second wavelength emitted by the device for the regeneration step is visible light. In certain embodiments, the light of the second wavelength emitted by the device is between 400-800 nm, between 400-700 nm, between 400-600 nm, between 500-600 nm, between 500-550 nm, or between 525-540 nm.

The photosensitive sorbent material is contained in a housing of the device. In certain embodiments, the photosensitive sorbent material can be movable relative to the housing in the device to expose all or part of the photosensitive sorbent material to the feedstock. The feedstock can be introduced into the device and towards the photosensitive sorbent material using ducting, fans, open air, or any suitable method. The effluent can be directed away from the photosensitive sorbent material and out of the device using ducting, fans, open air, or any suitable method.

The inside of the housing of the device can be shaped to collect the target chemical species after desorption from the photosensitive sorbent material. In embodiments in which the target chemical species is water vapor, the device may comprise condensation mechanisms through which the target chemical species may be directed over one or more condensation surfaces. In certain embodiments, the inside of the housing includes one or more condenser components such as cooled surfaces and/or pressure modifiers. In certain embodiments, the condensed target chemical species is directed towards the collector, such as via angled surface leading to a conduit. In certain embodiments, the collector is a container.

In certain embodiments, the device can apply a temperature and/or pressure that is different than the ambient temperature and/or ambient pressure as stimuli to promote switching between adsorption and desorption in addition to light exposure. The device may have a storage pressure ($P_{st}$) and/or storage temperature ($T_{st}$) that is different for the adsorption step than the delivery pressure ($P_{de}$) and/or delivery temperature ($T_{de}$) for the desorption step. In certain embodiments, $P_{st}$ can be greater than $P_{de}$. The pressure of the photosensitive sorbent material can be elevated to facilitate adsorption and/or reduced to facilitate desorption to modulate the target chemical species affinity for the photosensitive sorbent material.

In certain embodiments, $P_{st}$ can be equal to or greater than 1 bar. Increasing the pressure for adsorption may involve compressing air in a pressure chamber containing the photosensitive sorbent material. The devices comprising the photosensitive sorbent materials disclosed herein may adsorb target chemical species at lower pressures than desiccant based systems due to their favorable isotherm profiles. In certain embodiments, a device with the photosensitive sorbent material can adsorb a target chemical species at less than 50 bar, less than 40 bar, less than 30 bar, less than 20 bar, less than 10 bar, less than 9 bar, less than 8 bar, less than 7 bar, less than 6 bar, less than 5 bar, less than 4 bar, less than 3 bar, less than 2 bar, or less than 1.5 bar.

In certain embodiments, a device with the photosensitive sorbent material can desorb a target chemical species at more than 1 bar, more than 0.5 bar, more than 0.1 bar, more than 0.01 bar, or more than 0.001 bar.

In certain embodiments, $T_{de}$ can be higher than $T_{st}$. The photosensitive sorbent material can be cooled to facilitate adsorption by and/or heated to facilitate desorption by increasing the vapor pressure of the target chemical species to overcome physisorption forces and promote release of target chemical species. The device can apply heat directly or transfer heat through a heat exchanger. In certain embodiments heat can be from a waste heat stream or solar heat source.

In certain embodiments, a device with the photosensitive sorbent material can adsorb a target chemical species at a temperature less than or equal to the ambient temperature of the device (e.g., ≤25° C.). In such embodiments, the device may have a cooling system to cool the device below the ambient temperature. In certain embodiments, a device with the photosensitive sorbent material can desorb a target chemical species at a temperature greater than or equal to the ambient temperature of the device (e.g., ≥25° C.).

Figure 5:
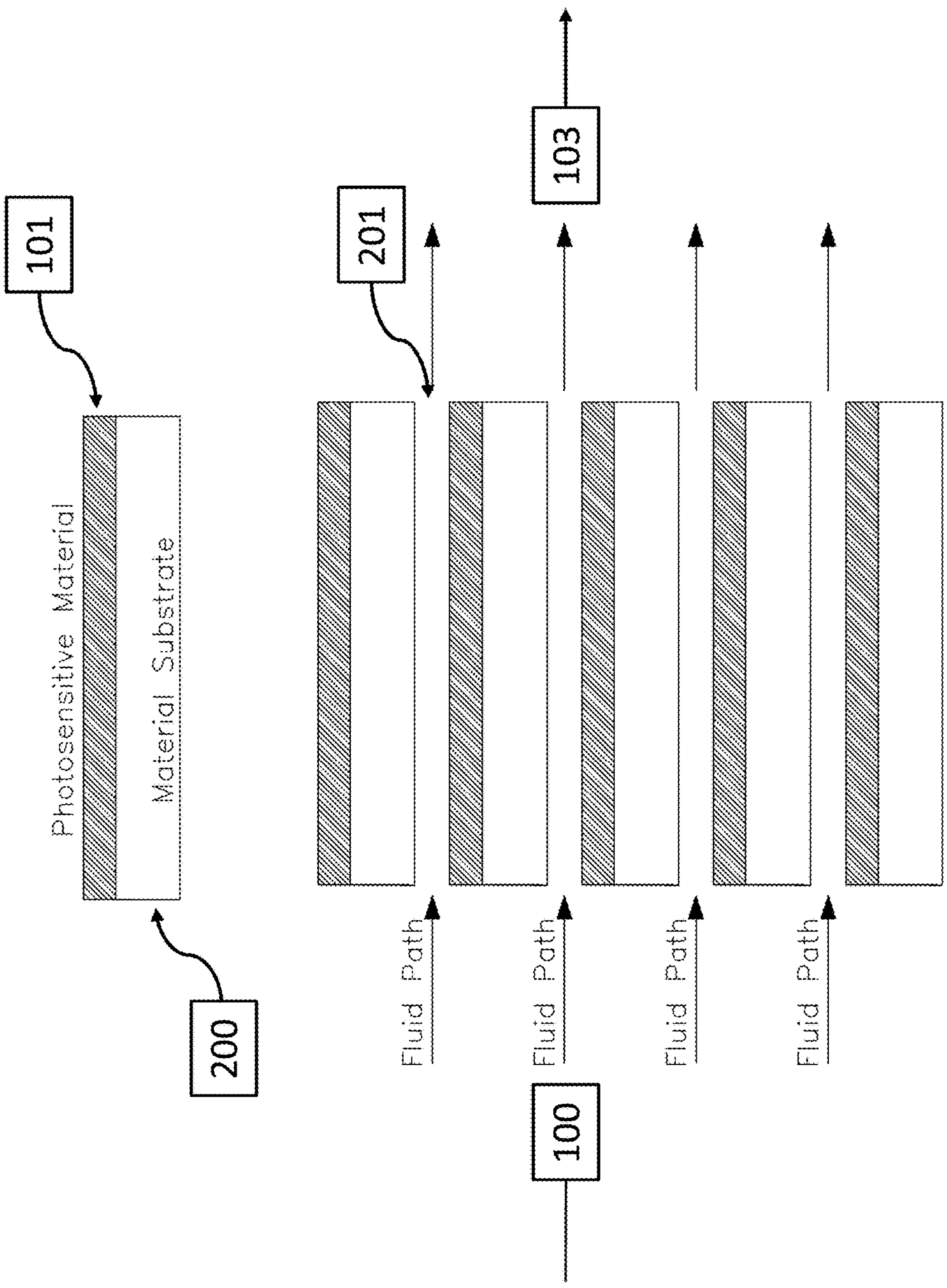
FIG. 5 illustrates an example of a system for the concentration of a target chemical species comprising a photosensitive sorbent material deposited on a solid substrate that is a flat surface stacked with small gaps.

In a preferred embodiment, the gaseous or liquid stream of the feedstock is exposed to a large surface area of the photosensitive sorbent material to maximize interactions with the target chemical species. In embodiments, the photosensitive sorbent material 101 can be deposited on a solid substrate 200. In certain embodiments, the device comprises one or more substrates that are flat surfaces. In certain embodiments, two or more substrates are stacked with small gaps 201 for gaseous or liquid stream to flow through and to contact a surface of each of the one or more substrates to enable adsorption of the target chemical species from the feedstock to the PCN, as shown in FIG. 5. In certain embodiments, the size of the gap is between approximately 0.5 millimeters to 10 centimeters. In certain embodiments, the length of the substrate is tailored for optimal adsorption of the target chemical species. In certain embodiments, the length of the substrate is between 1 nm to 2 m. In certain embodiments, at least some of the substrates are laid in series to allow for adjustable length based on conditions for optimal adsorption of the target chemical species.

Figure 6:
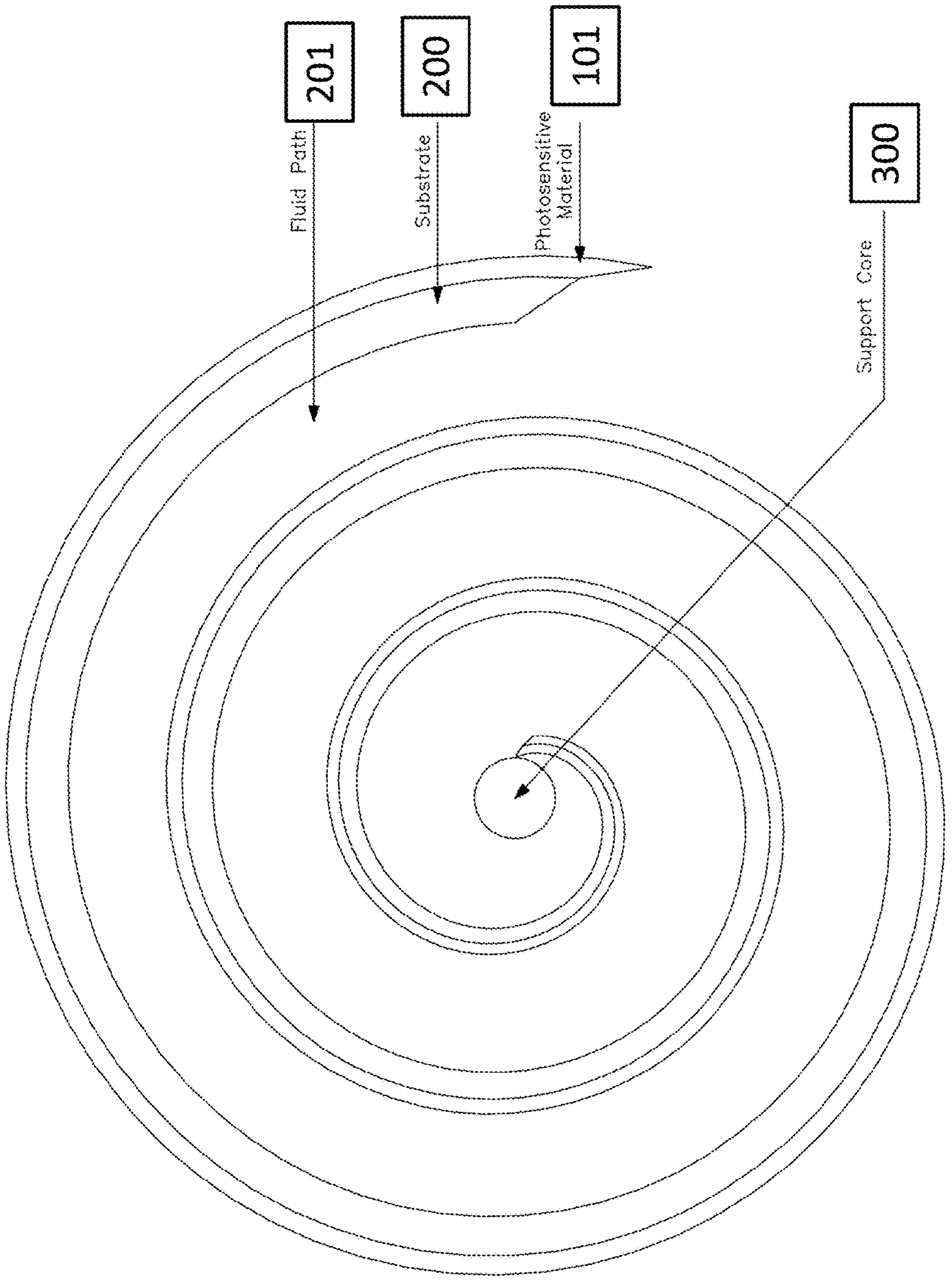
FIG. 6 illustrates an example of a system for the concentration of a target chemical species comprising a photosensitive sorbent material deposited on a solid substrate that is rolled in sheets around a support core.

In certain embodiments, the solid substrate is a sheet wrapped in a spiral pattern around the support core 300 with a gap 201 between surfaces of the solid substrate for the gaseous or liquid stream of the feedstock to flow through, as shown in FIG. 6.

Figure 7:
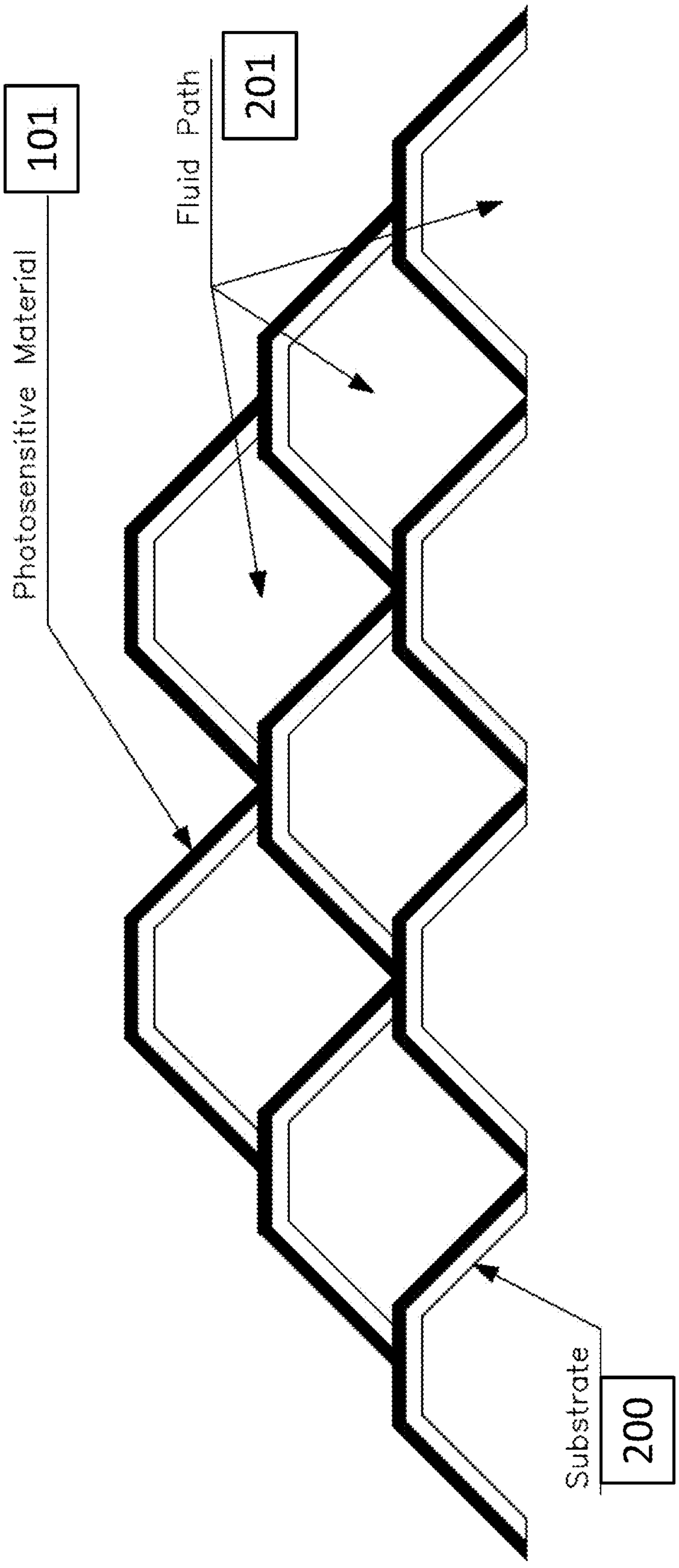
FIG. 7 illustrates an example of a system for the concentration of a target chemical species comprising a photosensitive sorbent material deposited on a solid substrate that is arranged in a corrugated patterning providing gaps for the flow of gaseous or liquid feedstock streams.

In certain embodiments, the substrate 200 on which the photosensitive sorbent material 101 is disposed is arranged in a corrugated pattern to provide gap supports 201, as shown in FIG. 7.

Figure 8:
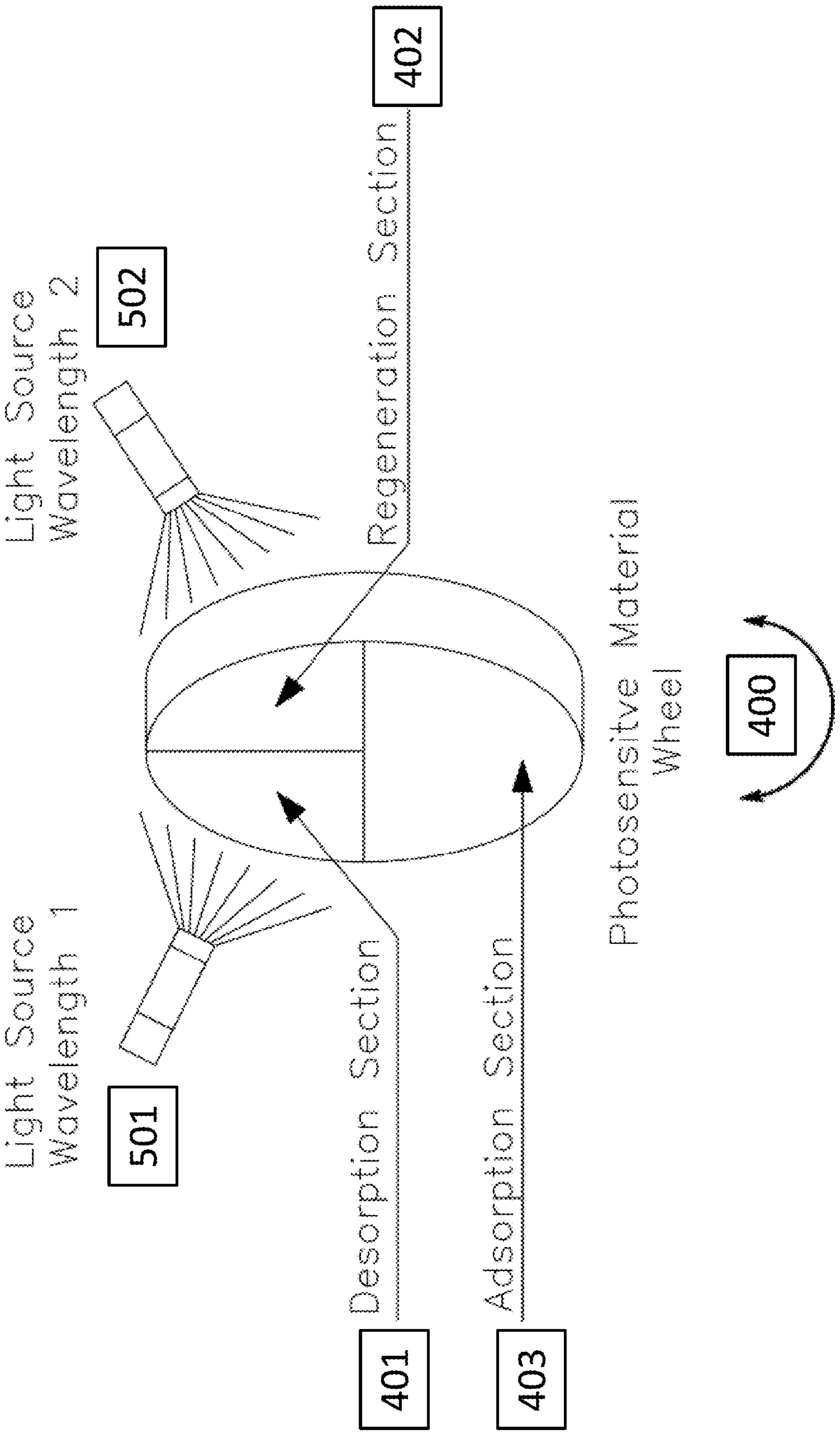
FIG. 8 illustrates an example of a system for the concentration of a target chemical species with a rotatable wheel structure comprising a photosensitive sorbent material deposited on a solid substrate for a semicontinuous isolation process.

In certain embodiments, the device contains a rotatable wheel comprising the substrate on which the photosensitive sorbent material is disposed, as shown in FIG. 8. In certain embodiments, the rotatable wheel comprises the substrate arranged in a corrugated pattern (e.g., corrugated material wrapped in a circular fashion) that enables at least some of the feedstock to flow through gaps in the corrugated structure of the substrate such that the feedstock contacts surfaces of the substrate to enable adsorption of the target chemical species from the feedstock to the PCN. In other embodiments, an outer surface of the rotatable wheel may be provided with the substrate comprising the photosensitive sorbent material. In certain embodiments, the wheel is rotatable (e.g., by a motor, such as an indexed servo-motor) in a clockwise or counterclockwise fashion to allow for continuous or semicontinuous adsorption and desorption of the target chemical species. In such an embodiment, the device comprises at least two light sources positioned to illuminate different portions of the wheel. An opaque wall may be positioned between the first and second light sources to impede light seepage to other areas of the wheel. In other embodiments, a light source may be secured to the wheel itself, and the light emitted by the light source may change wavelengths depending on the angular positioning of the wheel. A first light source near/at a desorption position may be configured to provide light of a first wavelength to a portion of the photosensitive sorbent material positioned near an desorption position to convert the portion of the photosensitive sorbent material to a closed configuration. A second light source near/at an adsorption position may be configured to provide light of a second wavelength to a portion of the photosensitive sorbent material positioned near the adsorption position to convert the portion of the photosensitive sorbent material to the open configuration. As the wheel rotates, each portion of the wheel rotates through the adsorption position (where the photosensitive sorbent material within each portion is changed to the open configuration) and the desorption position (where the photosensitive sorbent material within each portion is changed to the closed configuration. During operation, a first portion of the photosensitive sorbent material on the wheel is in the open configuration and a second portion of the photosensitive sorbent material on the wheel is in the closed configuration at all times.

To provide further detail of the above, the rotatable wheel shown in FIG. 8 has a desorption section 401 during normal operation where the first light source 501 of a first wavelength (e.g., UV light) irradiates the photosensitive sorbent material that has adsorbed the target chemical species to desorb and collect the target chemical species (e.g., converting from open phase to closed phase). In certain embodiments, the rotatable wheel also has a regeneration section 402 during normal operation where the second light source 502 of a second wavelength (e.g., visible light) irradiates the photosensitive sorbent material to convert it from the closed phase back to the open phase. In certain embodiments, the rotatable wheel has an adsorption section where the photosensitive sorbent material is in an open phase and can adsorb the target chemical species from the liquid or gaseous stream of the feedstock. The desorption section is positioned within a closed chamber such that desorbed molecules of the target chemical species are not lost into the effluent stream. In the embodiments discussed herein, the wheel is positioned such that a portion of the wheel is positioned within the closed chamber and a portion of the wheel is positioned within the stream of feedstock. As the wheel rotates, the portion of the wheel that was initially in the desorption section in the closed chamber passes into the adsorption section where it is exposed to the feedstock (after passing through the regeneration section 402 discussed herein where it is exposed to light to transform the photosensitive sorbent material into the open stage. Simultaneously, the portion of the wheel that was originally positioned within the adsorption section rotates into the closed chamber of the desorption section where light is emitted onto the photosensitive sorbent material to transform the photosensitive sorbent material into the closed stage to desorb the target chemical species therefrom. During use, the wheel rotates such that each angular position on the wheel rotates through the adsorption section, desorption section, and regeneration section. For example, a target chemical species is adsorbed within a first portion of the photosensitive material at a first angular position. The wheel continues rotating, such that the first portion of the photosensitive material rotates to a second angular position in the desorption section, where it is exposed to the first wavelength of light provided by the light source 501 and the target chemical species is desorbed. The wheel continues rotating and the first portion of the photosensitive material rotates into the regeneration section at a third angular position where it is exposed to the second wavelength of light emitted by the light source 502 before it rotates back into the adsorption section.

In certain embodiments, the light source (e.g., LED, OLED, flexible light source, and/or the like) is applied to the backing of the photosensitive sorbent material to deliver light at the interface of the photosensitive sorbent material and the solid substrate. In certain embodiments, the device comprises one or more mirrors to direct light to different sections of the photosensitive sorbent material (e.g., UV light to desorption section and visible light to the regeneration section of the rotatable wheel). In certain embodiments, the substrate is transparent (e.g., clear glass, clear plastic, or polymer film). In certain embodiments, the light source (e.g., LED) is positioned underneath the transparent substrate or embedded into the transparent substrate. In certain embodiments, the light source has two modes and is switched between a first mode for emitting light of a first wavelength for desorption and a second mode for emitting light of a second wavelength for regeneration. In such embodiments, the light source may be secured to the wheel. The light source may comprise a plurality of independently controllable sections positioned at different angular positions of the wheel. The light source may rotate with the wheel and each of the independently controllable sections may be configured to switch between the first mode and the second mode based on the angular position of the wheel.

In embodiments, effluent from the feedstock after adsorption of the target chemical species is sent to a waste stream to be released from the device. In certain embodiments, the effluent may be released directly into the environment with or without treatment depending on the composition of the effluent. In certain embodiments, the effluent is directed back to an inflow conduit of the device as a feedstock if a significant amount of the target chemical species is present in the effluent. In other embodiments, the effluent may be utilized as feedstock for a second device having a photosensitive sorbent material configured to adsorb a different target chemical species.

Following the desorption step, the target chemical species is collected in the collection apparatus. In certain embodiments the target chemical species can be further processed (e.g., water vapor condensed to liquid water).

In certain embodiments, a method for concentrating a target chemical species using the device comprising the photosensitive sorbent material occurs in a semi-continuous manner with simultaneous adsorption and desorption steps at different regions of the photosensitive sorbent material. A semi-continuous operation is defined as a process composed of cycles of batch operations that are linked in a continuous sequence. In certain embodiments, the photosensitive sorbent material is moved (lateral movement, angular movement, and/or the like) to different locations of the device for adsorption, desorption, and regeneration steps (FIG. 8). For example, a target chemical species is adsorbed by the photosensitive material at a first position of the device exposed to the inflow conduit and the outflow conduit. Then, the photosensitive sorbent material is moved laterally to a second position of the device where it is exposed to the first wavelength of light provided by a first light source and the target chemical species is desorbed and collected in the collection apparatus. The photosensitive material is next moved laterally back to the first position where it is exposed to the second wavelength of light provided by a second light source for regeneration (e.g., the photosensitive sorbent material is converted back to the open phase from the closed phase). In another example, the photosensitive material is moved laterally to a third position following desorption at the second position where it is exposed to the second wavelength of light provided by a second light source for regeneration, then it is moved laterally back to the first position of the device for adsorption. Cycles of absorption, desorption, and regeneration are repeated in a semi-continuous operation.

Figure 9:
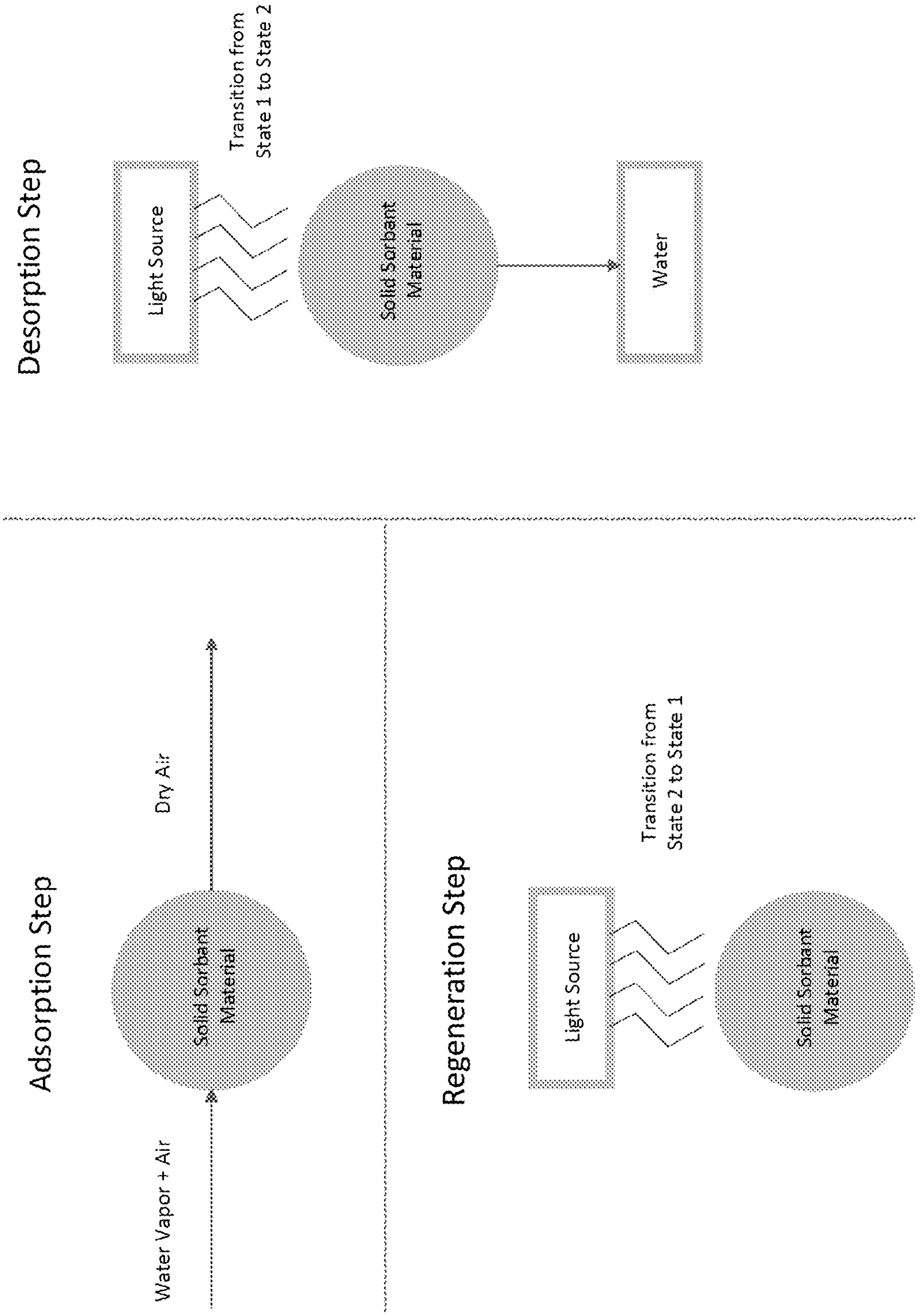
FIG. 9 shows the adsorption, desorption, and regeneration steps for a batch process for the concentration of water vapor from air using a photosensitive sorbent material.

In other embodiments, a method for concentrating a target chemical species using the device comprising the photosensitive sorbent material occurs in a batch process with adsorption, desorption and regeneration steps each occurring at separate times. As shown in FIG. 9, the entirety of the photosensitive sorbent material is exposed to a first wavelength of light (e.g., UV light) for desorption to capture the target chemical species, then the entirety of the photosensitive sorbent material is exposed to a second wavelength of light (e.g., visible light) for regeneration and the photosensitive sorbent material can then adsorb more of the target chemical species. The process may comprise repeated cycles of adsorption, desorption, and regeneration. For example, a target chemical species is adsorbed by the photosensitive material which is exposed to the inflow conduit and the outflow conduit of the device. The inflow and outflow conduits of the device may be closed after adsorption to create a closed chamber, and a light source exposes the photosensitive sorbent material to a first wavelength of light to transform the photosensitive sorbent material to the closed phase and the target chemical species is desorbed into the closed chamber and collected in the collection apparatus. After desorption, the inflow and outflow conduits are reopened and the photosensitive material is exposed to the second wavelength of light provided by the light source for regeneration (e.g., the photosensitive sorbent material is converted back to the open phase from the closed phase). The photosensitive material can then repeat a subsequent cycle of absorption, desorption, and regeneration.

In certain embodiments, the feedstock is in a gaseous state. In certain embodiment, the feedstock is atmospheric air. In certain embodiments, the target chemical species collected from the gaseous feedstock is water vapor ($H_2O$), carbon dioxide ($CO_2$), hydrogen sulfide ($H_2S$), nitrogen ($N_2$), oxygen ($O_2$), hydrogen, $H_2$, acetylene ($C_2H_2$), methane ($CH_4$), propane ($C_3H_8$), argon (Ar), or a volatile organic compound (VOC). VOCs include but are not limited to aromatic hydrocarbons (e.g., benzene, toluene, xylene, ethyl benzene), halogenated hydrocarbons (e.g., methyl chloride, methylene chloride, trichloroethylene, vinyl chloride), ethylene glycol, methyl tert-butyl ether, and formaldehyde.

In certain embodiments, the device operates in gaseous streams to separate one or more target chemical species from the gas of the feedstock. In certain embodiments, air is directed a device comprising the photosensitive sorbent material fixed onto a solid substrate. For example, raw source air may be drawn into the device via a vacuum pressure formed at an inlet via a compressor (e.g., a turbine compressor having a plurality of stator or variable pitch turbine blades controllable via indexed servo motors) and/or a centrifugal fan configured to increase the raw air pressure entering the device. In certain embodiments, the compressor and/or centrifugal fan may be rotated by one or more electrical motors (which may receive electrical input power from one or more power systems in communication with the air preconditioning system) mechanically connected with the compressor and/or centrifugal fan via a gear transmission, a belt drive, a chain drive, and/or the like. In embodiments comprising a centrifugal fan, particulates, dust, and other heavy air contaminants are spun to the outermost edge of the centrifugal fan and are removed from the air stream and ejected from the device. In certain embodiments, a filter will be placed at the air inlet to remove particulates, dust, and other heavy air contaminants.

In certain embodiments, the photosensitive sorbent material is located in a pressure vessel in the device. In certain embodiments, pressure increases are applied to the photosensitive sorbent material in the pressure vessel in pulses or by a gradual pressure increase to facilitate adsorption.

In certain embodiments, the photosensitive sorbent material is cooled to facilitate adsorption by reducing the vapor pressure of the target chemical species. In certain embodiments, the photosensitive sorbent material is cooled by radiation cooling into the atmosphere, heat exchangers, direct cooling, or other such cooling processes.

In other embodiments, the feedstock is in a liquid state. In certain embodiments the liquid feedstock is an aqueous solution (e.g., the target chemical species is dissolved in water). In certain embodiments, the target chemical species is a metal ion, such as silver, gold, uranium, lithium ions. In certain embodiments, the target chemical species is an inorganic or organic chemical. In certain embodiments, the device operates in liquid streams with the intent of separating one or more target chemical species from the bulk liquid feedstock.

Certain embodiments may comprise a plurality of photosensitive sorbent materials for the concentration of two or more target chemical species. Each photosensitive sorbent material may have a different chemical composition and/or structure (e.g., different metal, photosensitive ligand, and/or bridging ligand in each molecular building block, different components in addition to the PCN, etc.) optimized for adsorption of the desired target chemical species. In some embodiments, a first photosensitive sorbent material is tuned for adsorbing water vapor and a second photosensitive sorbent material is tuned for adsorbing $CO_2$. In these embodiments, each sorbent material may be fed with an independent feed stock. In other embodiments, the first and second photosensitive sorbent materials may be arranged in series, such that the effluent stream from the first sorbent material is provided as feedstock to the second sorbent material. For example, the first photosensitive sorbent material may adsorb water vapor, and the second photosensitive sorbent material may adsorb $CO_2$ from the same stream of air provided to the system. The system may provide different conditions such as pressure and/or temperature changes optimal for the adsorption and/or desorption of each target chemical species.

Atmospheric Water Generation

The process of AWG comprises systems and methods for extracting water vapor from atmospheric source air by capturing the water vapor with the photosensitive sorbent materials disclosed herein and capturing the condensed, liquid water. Certain embodiments comprise steps for preconditioning and/or compressing raw source air (e.g., air at atmospheric conditions) to ease the water extraction process, and/or condensing the water vapor trapped within the raw source air (e.g., by increasing the humidity of at least a portion of the raw source air) to maximize the amount of water vapor that may be extracted from a given unit volume of source air. As discussed herein, processed source air is compressed, consolidated, and/or otherwise manipulated through one or more processes, for example, to ease the water extraction process.

Various embodiments of the AWG process may comprise condensation mechanisms through which the concentrated water vapor desorbed from the photosensitive material may be directed over one or more condensation surfaces each having a lowered surface temperature (e.g., below the dew point of the water vapor). As the concentrated water vapor flows over and/or around the condensation surfaces, the temperature of the source air adjacent the condensation surfaces drops (e.g., through convective heat transfer), and water vapor condenses on the condensation surfaces, and the condensed, liquid water flows into a storage vessel (e.g., a capture tank) and/or to one or more related modules (e.g., a greenhouse module) for immediate use.

Air Preconditioning

As noted above, raw source air (as a feedstock) may be preconditioned to ease the water extraction process utilized to ultimately condense water vapor into usable liquid water. In certain embodiments, the preconditioning process may comprise steps for compressing the air to increase the vapor pressure of the air (thereby biasing a greater volume of water to the liquid state rather than the vapor state) and/or to decrease the temperature of the source air and/or photosensitive sorbent material to a temperature nearer to the dew point.

As just one example, the air preconditioning process may comprise a series of compressors/pumps, venturi valves, vortex valves, manifolds, and/or the like collectively configured to decrease the temperature of the source air closer to the air dew point and/or to increase the pressure of the air prior to removing water vapor from the air.

Moreover, in certain embodiments the air-preconditioning system may be omitted, and raw air as a feedstock may be filtered and/or directed immediately into a chamber with the photosensitive sorbent material. Such embodiments may have a lower input power requirement, and therefore the amount of power required for water generation may be decreased.

It should also be understood that certain preconditioning system embodiments comprise one or more filters (e.g., fabric-based air filters, non-woven based air filters, and/or the like), and/or one or more refrigerant systems (e.g., warm air is passed through a heat-exchanger to lower the temperature of the air closer to the dew point).

Condensation Process

Following desorption from the photosensitive sorbent material, concentrated water vapor may be passed through a condensation chamber as discussed herein to condense water vapor in the air into usable liquid water.

The condensation chamber may be embodied as a heat exchanger (e.g., a cross-flow heat exchanger) or another chamber having a series of chilled condensation surfaces on which water vapor condenses into liquid water. For example, the condensation chamber may comprise a series of tubes and/or coils (e.g., metallic tubes and/or coils) in which the processed air passes through. The exterior surfaces of the tubes and/or coils are chilled (e.g., by a refrigerant, a super-cooled gas, a cooled liquid, and/or the like) such that water in the processed air condenses on the interior surfaces of the tubes and/or coils. In such embodiments, the tubes and/or coils may be angled, such that the condensed water streams out of the tubes and/or coils and into a retention chamber.

As yet another example, the condensation chamber may comprise a series of chilled tubes and/or coils (e.g., having super-cooled gas, refrigerant, cooled liquid, and/or the like flowing through the interior of the chilled tubes and/or coils), and the processed air may run across the exterior surface of the chilled tubes and/or coils such that water condenses on the exterior surfaces of the tubes and/or coils.

It should be understood that the condensation surfaces may have any of a variety of shapes and/or configurations. As mentioned, condensed water flows off of the condensation surfaces into a retention chamber. The retention chamber may comprise one or more water catch trays positioned under the condensation surfaces and configured to capture water dripping off of the condensation surfaces. The water catch trays may be angled toward a holding reservoir configured to hold a volume of water collected via the condensation process. In certain embodiments, the holding reservoir may comprise one or more water outlets in fluid communication with liquid conduits leading to one or more external systems, such as agricultural systems, potable water systems, and/or the like.

Carbon Dioxide Process

Air (which may comprise the effluent exiting a water consolidation system as discussed herein) may be passed through a carbon dioxide capture system. The carbon dioxide may be captured from the air prior to exhaustion to the atmosphere for filtration and/or disposal (e.g., through one or more chemical processes to convert the carbon dioxide into water, oxygen, and/or a solid or liquid composition that may be disposed of; through capture of the carbon dioxide in a filtration media; and/or the like). The device may use a photosensitive sorbent material with a particular composition and conditions optimized for the collection of carbon dioxide, which may be different than the composition of the photosensitive sorbent material and conditions used for the concentration of water vapor.

In certain embodiments, captured carbon dioxide may be directed to a greenhouse to optimize the internal greenhouse environment for plant growth. As discussed herein, the greenhouse may be supplied by water generated by the AWG system discussed herein.

Power Generation Processes

Certain embodiments of the foregoing systems for the concentration of target chemical species may incorporate one or more power-consuming components, such as air blowers, gas/air compressors, liquid fluid pumps, resistance heaters, motors, monitoring computing devices, and/or the like. These components (as well as other power-consuming components of various embodiments) may receive electrical power from one or more integrated power generation mechanisms of the described system. As noted above, certain embodiments may be operated proximate hydrocarbon fuel wells, and off-gases (e.g., natural gas) from those fuel wells may be combusted and utilized to generate power through energy-generating turbines (e.g., steam turbines). As yet another example, various embodiments may comprise one or more solar heat-generating mechanisms as discussed above, and these solar-heat generating mechanisms may additionally comprise one or more electrical energy generation mechanisms for converting solar energy into storage electrical energy (which may be stored via one or more batteries, uninterruptable power supplies (UPSs), and/or the like.

Moreover, the AWG system and/or power generating aspects of the AWG system may be associated with a greenhouse or other agricultural system for facilitating plant growth (e.g., consumable plant growth). Thus, the power generation systems may be configured to provide electrical power to various aspects of the agricultural system, such as heating/cooling mechanisms for air within the greenhouse, air circulation blowers within the greenhouse, artificial growth lights within the greenhouse, water/irrigation pumps within the greenhouse, agricultural robots (e.g., planters, harvesters, and/or the like) within the greenhouse, and/or the like.

The agricultural module may additionally comprise one or more sensors that may be provided within the growth medium of the agricultural module. These sensors may be embodied as a portion of a flexible bundle of electrical circuitry, including conductors, sensors, and/or the like that may be quickly deployed within an agricultural module by unrolling the bundle onto a support surface of the agricultural module before providing the growth medium therein. In certain embodiments, the various sensors may be electrically connected relative to one another, relative to a control computing system, and/or relative to a power source via one or more conductors (e.g., flexible conductors). The various sensors may comprise moisture sensors, temperature sensors, carbon dioxide content sensors, oxygen sensors, humidity sensors, and/or the like. It should be understood that certain of the described sensors may be configured for wireless data transmission to a computing system via one or more wireless communication technologies, such as Wi-Fi, Bluetooth, and/or the like.

In certain embodiments, sensor outputs (e.g., indicative of measured aspects of the environment within the growth habitat) may be utilized by the controlling computing system to regulate the environmental conditions within the growth habitat. For example, the computing system may comprise data indicative of one or more target environmental conditions, such as a target temperature, target carbon dioxide content, and/or the like. Based on the monitored data output from the various sensors within the growth habitat, the computing system is configured to compare the monitored data output against the target environmental conditions, and may be configured to adjust water flows, carbon dioxide flows, and/or the like from the AWG into the growth habitat. For example, the computing system may be configured to automatically activate sprinkler systems within the growth habitat to water the plants within the growth habitat in response to predetermined conditions; to increase and/or decrease the amount of carbon dioxide flowing into the growth habitat from carbon dioxide capture systems of the AWG system, and/or the like.

In certain embodiments, various portions of the AWG system may be enclosed within one or more shipping containers that may be easily transported as modular system components to desired operating locations. For example, the air preconditioning system may be enclosed within a first container, and one or more water and/or carbon dioxide consolidation systems may be enclosed within a second shipping container, with various ports/inlets extending through walls of the shipping containers to enable connection with one or more geothermal cooling systems, solar heating systems, high-pressure gas inputs, and/or the like. In certain embodiments, one or more condensation systems, water storage tanks, and/or the like may be embodied within a third storage container. However, it should be understood that certain embodiments may be configured such that the entirety of the AWG system may be enclosed within a single storage tank, with one or more ports/inlets extending through walls thereof to enable interaction with aspects of the surrounding environment (e.g., air inlets/exhausts, high pressure gas inlets, solar heating inlets/outlets, geothermal cooling inlets/outlets, and/or the like).

EXAMPLES

Large colorless hexagonal crystals of [Cd(BTCP)-(DPT)$_2$·3DMF], LMA-1-α, and [Cd(BTCP)(FDPT)$_2$·3 DMF], LMA-2-α, ($H_2$DPT=2,5-diphenylbenzene-1,4-dicarboxylic acid, $H_2$FDPT=2,5-di-(4-fluorophenyl)benzene-1,4-dicarboxylic acid, BTCP=1,2 bis[2-methyl-5-(4-pyridyl)-3-thienyl]perfluorocyclopentene) were obtained through solvothermal reaction of $Cd(NO_3)_2·4H_2O$ with BTCP and either $H_2$DPT or $H_2$FDPT in a solution of ethanol and N,N-dimethylformamide (DMF).

Single crystal X-ray diffraction (SCXRD) analysis revealed that LMA-1-α and LMA-2-α are isostructural, both having crystallized in the space group P21/c with one cadmium cation, two half DPT (or two half FDPT) ligands, one BTCP ligand and three DMF guest molecules per asymmetric unit (ASU). Each cadmium molecular building block (MBB) extends to form a 3D non-interpenetrated network with 8-c hex topology.

Figure 10:
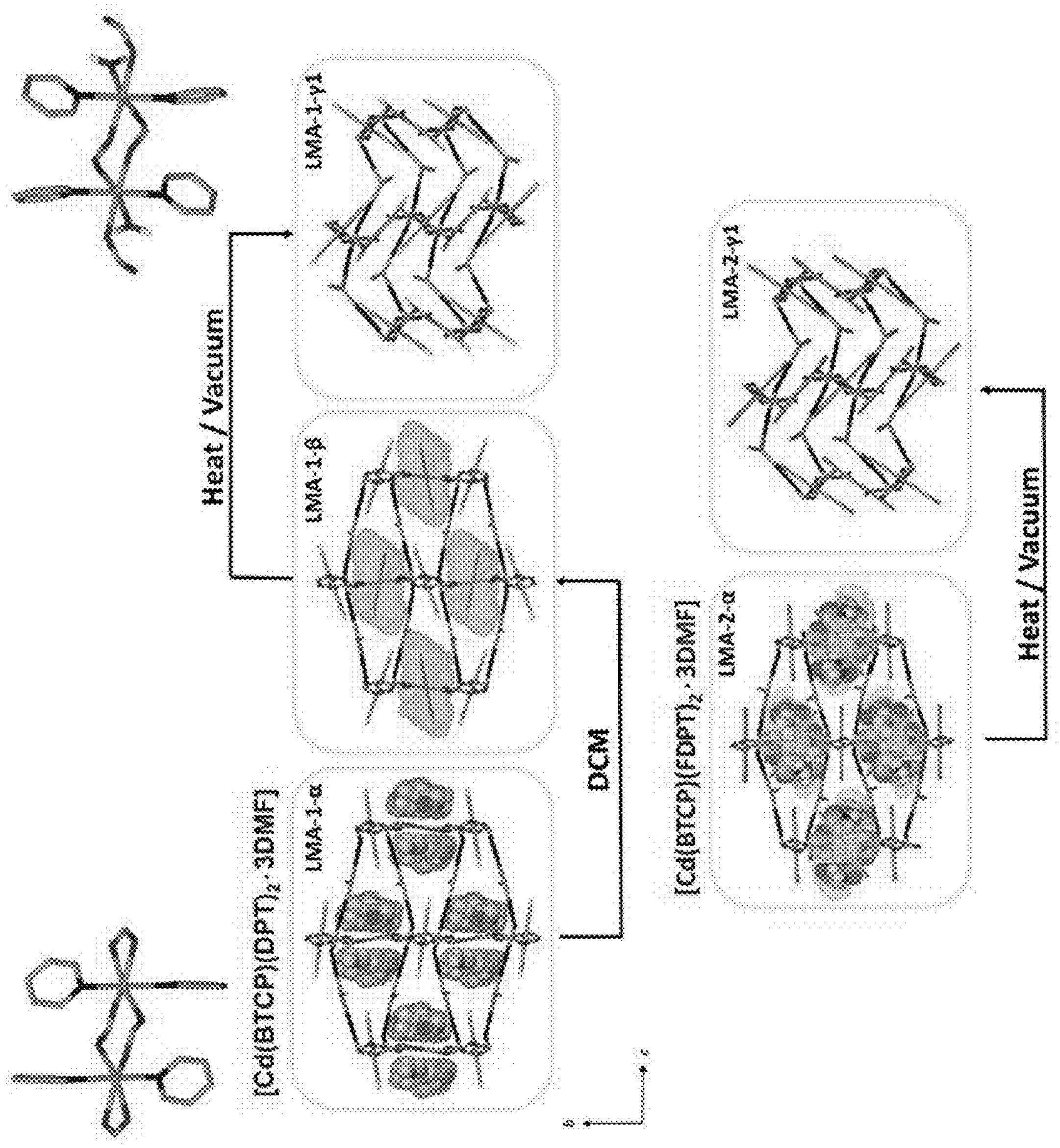
FIG. 10 shows the structural transformations experienced by LMA-1 (top) and LMA-2 (bottom) upon guest exchange and activation in air.
Figure 11A:
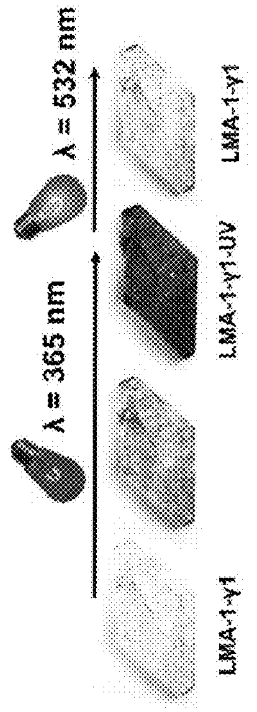
FIG. 11A shows photomicrographs of a crystal of LMA-1γ1 irradiated with UV light (365 nm) and then with white light (532 nm). High pressure $CO_2$ sorption isotherms are shown for LMA-1γ2 (FIG. 11B) and LMA-2γ2 (FIG. 11D) at 298K. Selected pressures corresponding to in situ $CO_2$-loaded PXRD patterns are shown for LMA-1γ2 (FIG. 11C) and LMA-2γ2 (FIG. 11E).
Figure 11B:
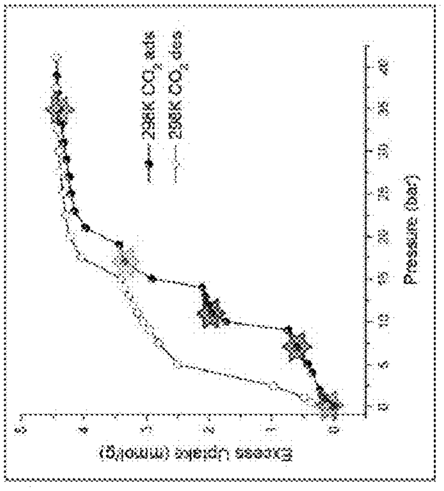
Figure 11C:
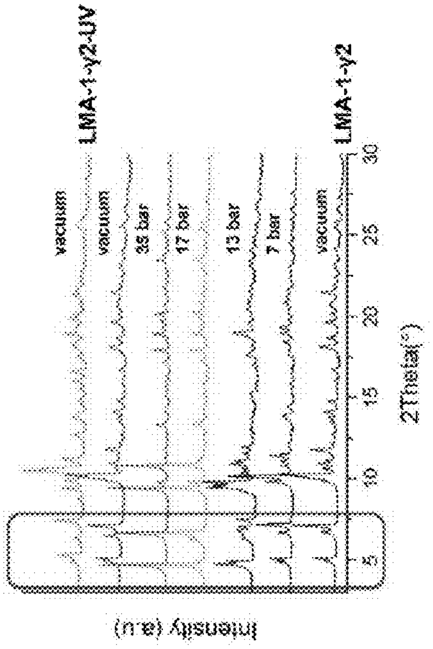
Figure 11D:
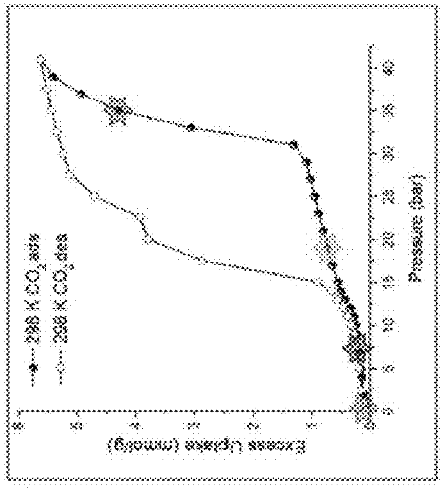
Figure 11E:
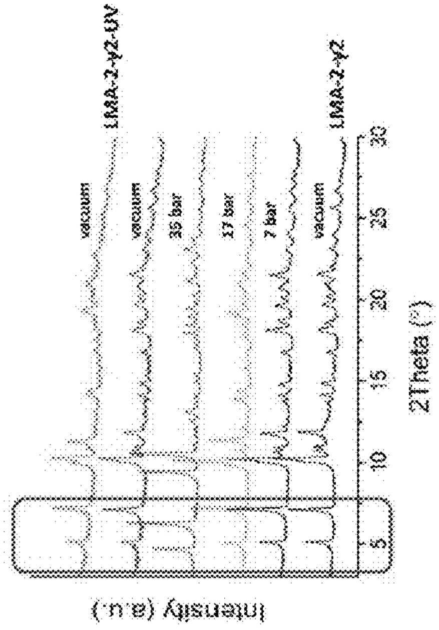

As shown in FIG. 10, in LMA-1-α, DMF occupied channels account for 27% of unit cell volume (determined using a Connolly map with a 1.5 Å probe radius) and are separated by the presence of DPT ligands rotated into the a-axis while DPT ligands located at the apex of each channel are oriented along the c-axis. The channels in LMA-2-α account for 32% of unit cell volume and, unlike in LMA-1-α, the FDPT ligands orient diagonally to the a-axis connecting two channels into one at regular intervals. The FDPT ligands at the apex of each channel remain oriented along the c-axis. The distances between the two photoactive carbon atoms in LMA-1-α and LMA-2-α are 3.708(9) and 3.621(4) Å, respectively.

When crystals of LMA-1-α were soaked in dichloromethane (DCM), they underwent rapid striation and SCXRD analysis revealed the formation of a new phase (LMA-1-β) with the space group unchanged but with the b-axis reduced by 1.2 Å and the unit cell volume by 11%. This transformation can be ascribed to rotation of the DPT ligand, which was previously oriented into the a-axis and now points diagonally along the c-axis, dividing the corrugated channels into isolated cavities that account for 21% of unit cell volume. Although the DCM guest molecules could not be modelled crystallographically, the residual electron density analysis, as implemented by the SQUEEZE routine of PLATON, indicated the presence of two DCM molecules per ASU. The distance between the two photoactive carbon atoms in LMA-1-β remains almost unchanged (3.708(2) Å). Soaking LMA-2-α in DCM induced immediate powdering and thus LMA-2-β was not studied further.

When heat or vacuum was applied to LMA-1-β or LMA-2-α they underwent an additional structural transformation to the non-porous forms LMA-1-γ1 and LMA-2-γ1. Both sorbents were found to be isostructural with further reductions in the b-axis length and unit cell volume. The beta angles increased by 10.2° and 15.42° respectively. This concertina-type contraction resulted from cleaving of one of the previously chelating DPT (or FDPT) ligands to monocoordinate. In the presence of air, the coordinatively unsaturated metal was found to be occupied by an aqua ligand and, in the case of LMA-1-γ1, one guest water molecule was located. It should be noted that the transformations observed in LMA-2 caused fragmentation of the single crystals. The resulting powder was shown to be microcrystalline by powder X-ray diffraction (PXRD). Another notable feature of these transformations is that the reactive C . . . C distance in LMA-1-γ1 and LMA-2-γ1 decreased to 3.486(2) and 3.564(4) Å, respectively. This reduction, coupled with the better crystal quality, prompted us to study the effect of ultra-violet (UV) light upon LMA-1-γ1. The photomicrographs in FIG. 11(*a*) show that upon irradiation with UV light, an initially colorless single crystal of LMA-1-γ1 changed color to dark blue within seconds. This color change can be attributed to the formation of a C—C bond between the two reactive carbon atoms in the BTCP linker. This transformation was found to be reversible with the application of light of a higher wavelength as evidenced by reversion of crystal color from dark blue to colorless. Inspection of the LMA-1-γ1-UV crystal structure revealed that the reactive C . . . C distance is now a C—C bond of 1.701(6) Å. Furthermore, the a- and b-axes exhibited an increase, while the c-axis and beta angle decreased. The structure is non-porous and to the best of our knowledge is only the third ring-closed BTCP SCXRD structure incorporated into a PCN.

PXRD, thermogravimetric analysis (TGA) and Fourier transform Infrared spectroscopy (FTIR) experiments are consistent with SCXRD data. Variable temperature PXRD experiments under nitrogen flow on both LMA-α forms confirmed that these as-synthesized phases can directly transform to guest-free LMA-γ2 (no coordinated aqua ligands). In both cases, with increased heating (in the temperature range of guest-loss observed in TGA experiments) PXRD peaks were observed to shift to higher 2θ values, which is consistent with contraction of the unit cell. The PXRD diffractograms of both sorbents measured at 200° C. show some peak splitting. Without the SCXRD of LMA-γ2 to provide a reference PXRD, the origin of the observed peak splitting and variances between LMA-γ1 and LMA-γ2 cannot be verified. Overall, the PXRDs at 25° C. match well with those obtained for each phase under vacuum. To further investigate the phase behavior of both LMA-γ2 sorbents over a broad $P/P_0$ range, low temperature 77 K $N_2$, 195 K $CO_2$, and 195 K $C_2H_2$ gas sorption experiments were performed. LMA-1-γ2 underwent a switching (closed to open) phase transition with a threshold pressure of 0.16 bar while no appreciable $N_2$ uptake was observed for LMA-2-γ2. In the case of $CO_2$, LMA-1-γ2 underwent a 2-step transformation with a threshold pressure of 0.02 bar while LMA-2-γ2 underwent single-step conversion with an inflection at higher partial pressure (0.07 bar). The recyclability of both materials was investigated using $CO_2$ at 195 K. After four cycles of adsorption-desorption, no reduced performance was observed. The total uptake and effective working capacity (0.1-1 bar) for LMA-1-γ2 is about 114 cc $g^{-1}$ (STP) and 67 cc $g^{-1}$ (STP) respectively, while for LMA-2-γ2 it is 128 cc $g^{-1}$ and 121 cc $g^{-1}$. Upon exposure to $C_2H_2$, LMA-1-γ2 underwent a 3-step transformation with a threshold pressure of 0.01 bar while LMA-2-γ2 exhibited initial loading of 0.5 mmol at 0.02 bar, followed by a second step at 0.03 bar. A comparison of all six isotherms shows that LMA-1-γ2 underwent switching at lower partial pressures than LMA-2-γ2. Furthermore, LMA-1-γ2 exhibited two intermediate phases between closed and open while LMA-2-γ2 did not. Although the LMA-γ2 forms are isostructural, the substitution of fluorine for the hydrogen atom in DPT clearly influenced the sorption properties of the material. The single point pore volumes obtained from these cryogenic sorption experiments correlate well with pore volumes from SCXRD.

High-pressure $CO_2$ gas sorption experiments were collected at 273 K and 298 K (FIGS. 11(*b*) and 11(*d*)) and showed good agreement with the cryogenic data, in particular the high-pressure $CO_2$ isotherm profiles collected at 298 K vs. the $C_2H_2$ 195 K data. To gain further insight into the nature of the transformations of the LMA-γ2 forms, in situ PXRD experiments at selected pressures were performed. At 7 bar $CO_2$, the PXRD patterns of both LMA-γ2 forms (FIGS. 11(*c*) and 11(*e*)) revealed peak shifting to lower 2θ values consistent with expansion of the unit cell volume with a phase change occurring at 13 bar for LMA-1. At this pressure, the first PXRD peak had shifted to 2θ=4.75° with additional new peaks occurring at 2θ=6.35°, 7.31°, 9.46°, 10.40° and 19.01°.

The good pore volume agreement of LMA-1-γ2 suggests that this $CO_2$-loaded phase may be equivalent to LMA-1-β. At 17 bar, a second transformation was observed in LMA-1 with peaks shifting to even lower 2θ values. Four prominent peaks were observed at 2θ=4.75°, 6.75°, 9.44° and 10.91°. Unlike LMA-1, LMA-2 did not transform at this pressure. Further loading (35 bar) for LMA-1 showed only minor peak shifting, this phase being similar to LMA-1-α but with $CO_2$ as the guest. In the case of LMA-2, the PXRD pattern at 35 bar was markedly different to that at 17 bar but matched that of LMA-1. Upon exposure to vacuum, both sorbents reverted to the respective LMA-x-γ2 phases.

Having observed ring-closure in a single crystal of LMA-1, the effect of ring-closure upon the sorption properties of LMA-1-γ2 was investigated by continuously irradiating a bulk powder sample for six hours. The nature of the sorption and XRD photoirradiation experiments required that the data were collected on LMA-1-γ2 and LMA-1-γ1, respectively. An overlay of the PXRD pattern generated from the SCXRD of LMA-1-γ1-UV with the experimentally obtained PXRD pattern of LMA-1-γ2-UV obtained using an environment cell is consistent with isostructural but different crystal structures. The previously color-less sample turned dark blue and the PXRD diffractogram showed peak shifting to higher 2θ values consistent with contraction of the unit cell volume. New peaks were observed at 2θ=8.79°, 12.60° and 13.81° (FIG. 11(*c*)). Progressive loading of this phase with 7, 14 and 21 bar of $CO_2$ showed no changes in the PXRD pattern. This implies that the ring-closed LMA-1-γ2-UV form is stable and not subject to structural reopening under the pressure range studied.

This assumption was further investigated by reversibly irradiating a bulk sample of LMA-1-γ2 and collecting cryogenic and high-pressure $CO_2$ experiments at 195 K and at 298 K. Owing to experimental design limitations (relating to sample type, size and irradiation source availability), the powdered sample had to be continuously irradiated for several days. Depending on the extent of irradiation LMA-1-γ2-UV can reversibly reduce its loading capacity by 30-55%.

With the focus of gaining further insight into why a single atom substitution (from hydrogen to fluorine) creates such a marked difference in sorption properties, a computational study was performed. Periodic density functional theory (DFT) electronic structure minimizations were performed on the experimental crystal structures of LMA-1-α, LMA-1-β, and LMA-2-α desolvated in silico to assess their structural relaxation and intermediates. LMA-1-α was found to smoothly relax to a g-like structure, while LMA-1-β relaxed to a metastable open state, with notable changes to its crystal structure but no collapse. Interestingly LMA-2-α, while crystallographically similar in volume and lattice parameters to LMA-1-α, shares more structural similarities with LMA-1-β and as such, is also stabilized from collapse.

These relaxations illustrate several key points. LMA-1-α's crystal structure has a central DPT linker positioned along the a-axis surrounded by 4 BTCP linkers. Its optimization into a g-like structure results from three cooperative movements: rotation of the DPT linker; extension of two N—Cd bonds and displacement of the fluorinated backbone rings of the BTCP linkers. The empty space on either side of the DPT linker permits facile rotation around its central axis, defined by the Cd-carboxylate bonds on either end. At the onset of rotation, two N—Cd bonds from the terminal ends of BTCP linkers and cadmium nodes extend and shift from their original position, moving closer to the center of the pore. As the pore volume decreases, the terminal phenyl rings rotate towards the perfluorinated backbone on the BTCP linkers. The perfluorinated back-bones shift away from the incoming DPT linker, triggering the collapse into a g-like structure.

Furthermore, both LMA-1-β and LMA-2-α have a central DPT/FDPT linker positioned diagonally across their respective pores along the b-axis. If the 4 BTCP linkers are taken to be the walls of a pore, the central DPT linker in LMA-1-β has its para-hydrogen positioned outside of the pore walls at a distance of 3.91 Å away from the nearest BTCP fluorine. The resulting forces cause the rotation of the DPT linker to turn away from the fluorinated rings until it plateaus at an energy minimum with a position 7.53 Å away from the nearest BTCP fluorine. This motion, along with the lack of empty space, allows a rotation analogous to that present in LMA-1-α. This leads to no extension of the N—Cd bonds and no displacement of the fluorinated rings on the BTCP linkers, resulting in a metastable open state.

LMA-2-α has its central FDPT linker also positioned diagonally but protruding into the pore walls, at a distance of 2.86 Å away from the nearest BTCP fluorine. This restricted pore space prevented large cooperative movements to take place, leaving the structure in an open state with small changes to atom positions after optimization. Although LMA-2-α has been shown to collapse into its g-structure experimentally, it is postulated that this is only possible with external perturbations sufficient to overcome the energetic barrier presented by inherent steric hindrance, such as the movement of guest molecules during desorption.

These results demonstrate a readily accessible energy landscape for different phases of LMA-1 and support the experimentally observed behavior of LMA-1's sorption isotherm being multi-step in contrast to LMA-2. The DPT moiety in LMA-1 allows access to a variety of states from the open to closed phase as shown by the relaxation of LMA-1-α. Relaxation of LMA-1-β also showed the presence of metastable states that could correspond to distinct steps on the sorption isotherm. The physically relevant nature of the conformational states were assessed by the simulated excess adsorption isotherms of LMA-1-α and LMA-2-α confirming similar uptake at saturation, and for LMA-1-β, uptake characteristic of a state corresponding to a step in the isotherm.

From this data, it is inferred that fluorination of the DPT linker leads to a more sterically frustrated open phase in LMA-2, with an energy barrier associated with collapse that was not observed from the relaxation calculations of LMA-1. This behavior mirrors the sharp transition from the closed to the open phase shown in LMA-2's single-step sorption isotherm.

In summary, we present the first example of a family of light modulated adsorbents (LMAs) which reversibly switch (closed to open phase transformation) in response to multiple stimuli (i.e., gas/vapor and heat/vacuum) and which have light-responsive components incorporated into the backbone of the PCN, enabling a further ring-open to ring-closed transformation. In addition to bulk conversion in the form of powdered sorbent, we include a mechanistic understanding of the bulk conversion in large particles (i.e., single crystals). This insight, coupled with the effect single-atom substitution imparts on the host-guest interactions of these sorbents, enabled us to characterize a sorbent with improved performance (single-step switching with increased loading). Furthermore, the incorporated UV modulated molecular switch suggests an energy efficient method of desorption under ambient conditions, with applications for gas storage.

Ligand Synthesis

Commercially available starting materials and solvents were purchased from Sigma Aldrich, Merck and Fluorochem. All reactions were monitored using aluminum backed silica gel Merck 60 F254 TLC plates and visualized using UV irradiation. Column chromatography was carried out with Merck silica gel 230-400 mesh silica gel.

1.1 Synthesis of DPT

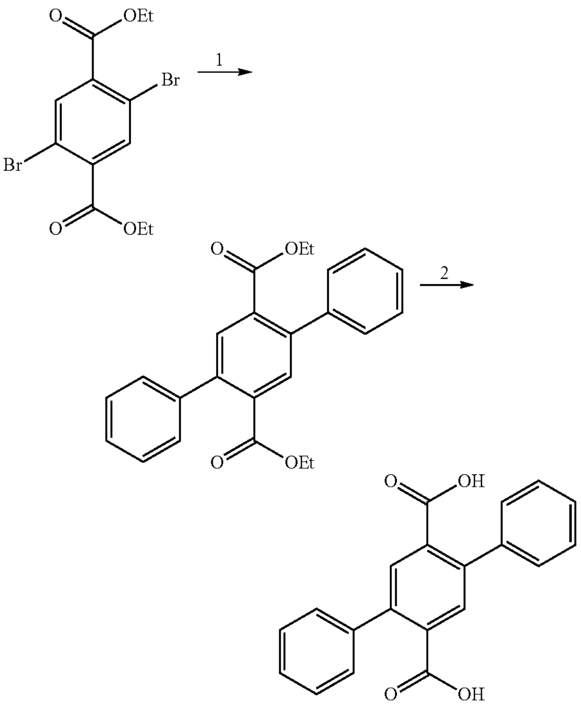

DPT

Step 1: A 1:1:1 mixture (total 150 ml) of ethanol, water and toluene was degassed using $N_2$ for 30 min. Thereafter, diethyl 2,5-dibromoterephthalate (7.5 g, 19.9 mmol, 1.0 eq), phenyl boronic acid (7.22 g, 59.6 mmol, 2.5 eq), $Pd(PPh_3)_4$ (1.15 g, 5.0 mol %) and $Na_2CO_3$ (10.55 g, 99.5 mmol, 5.0 equiv) were all added to the solvent mixture under an inert atmosphere. The resulting reaction mixture was heated to reflux under $N_2$. After 24 h, the mixture was allowed to cool to room temperature. TLC analysis confirmed complete conversion of the starting material, as well as product formation. The contents of the flask were then transferred to a separating funnel using toluene. Additional toluene (100 ml) was added, and the aqueous and organic layers were separated. After drying over $MgSO_4$, the organic layer was concentrated under reduced pressure affording diethyl [1,1':4',1"-terphenyl]-2',5'-dicarboxylate as the crude product. This material was used in the subsequent step without further purification.

Step 2: A 1:1 mixture (total 150 ml) of ethanol and water was added to the crude diethyl [1,1':4',1"-terphenyl]-2',5'-dicarboxylate product. NaOH (20 g, excess) was then added. The resulting reaction mixture was then heated to reflux, which was maintained for 24 h. After cooling to room temperature, the excess ethanol was removed under reduced pressure. The aqueous phase was filtered and carefully acidified using concentrated HCl resulting in the formation of a white precipitate. The white solid was isolated via filtration and washed thoroughly with water. After drying in a 105° C. oven overnight, 5.83 g (18.3 mmol, 92% over two steps) of DPT was isolated as a white solid. 1H NMR (400 MHz, MeOD) δ 7.76 (s, 2H), 7.45-7.36 (m, 10H) ppm.

1.2 Synthesis of FDPT

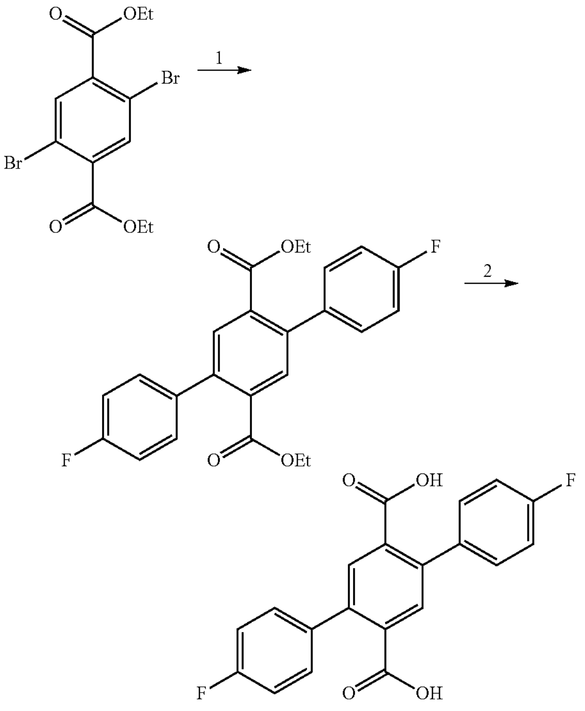

FDPT

Step 1: A 1:1:1 mixture (total 150 ml) of ethanol, water and toluene was degassed using $N_2$ for 30 min. Thereafter, diethyl 2,5-dibromoterephthalate (5.0 g, 13.2 mmol, 1.0 eq), (4-fluorophenyl)boronic acid (4.63 g, 33.1 mmol, 2.5 eq), $Pd(PPh_3)_4$ (0.76 g, 5.0 mol %) and $Na_2CO_3$ (7.0 g, 66.0 mmol, 5.0 equiv) were all added to the solvent mixture under an inert atmosphere. The resulting reaction mixture was heated to reflux under $N_2$. After 24 h, the mixture was allowed to cool to room temperature. TLC analysis confirmed complete conversion of the starting material, as well as product formation. The contents of the flask were then transferred to a separating funnel using toluene. Additional toluene (100 ml) was added, and the aqueous and organic layers were separated. After drying over $MgSO_4$, the organic layer was concentrated under reduced pressure affording diethyl 4,4"-difluoro-[1,1':4',1"-terphenyl]-2',5'-dicarboxylate as the crude product. This material was used in the subsequent step without further purification.

Step 2: A 1:1 mixture (total 150 ml) of ethanol and water was added to the crude diethyl 4,4"-difluoro-[1,1':4',1"-terphenyl]-2',5'-dicarboxylate. NaOH (20 g, excess) was then added. The resulting reaction mixture was then heated to reflux, which was maintained for 24 h. After cooling to room temperature, the excess ethanol was removed under reduced pressure. The aqueous phase was filtered and carefully acidified using concentrated HCl resulting in the formation of a white precipitate. The white solid was isolated via filtration and washed thoroughly with water. After drying in a 105° C. oven overnight, 3.70 g (10.4 mmol, 79% over two steps) of FDPT was isolated as a white solid. $^1H$ NMR (400 MHz, MeOD) δ 7.77 (s, 2H), 7.37-7.45 (m, 4H), 7.11-7.24 (m, 4H) ppm BTCP was synthesized according to our previously reported method (Nikolayenko, V. I., Castell, D. C., van Heerden, D., Barbour, L. J., *Angew. Chem. Int. Ed.* 2018, 57, 12086-12091).

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A photosensitive sorbent material for adsorbing a target chemical species, the photosensitive sorbent material comprising:

a metal;

a photosensitive ligand of the metal, wherein the photosensitive ligand is reversibly transformable between two different molecular structures according to a photochemical transformation; and a bridging ligand that coordinates two or more metal atoms, and wherein the photosensitive sorbent material is configured to reversibly transform from an open phase for adsorption of the target chemical species based in part on the photosensitive ligand and the bridging ligand to a closed phase with a stepped isotherm profile upon exposure to at least one stimulus, wherein at least a portion of the photosensitive sorbent material transforms from the open phase to the closed phase upon exposure to at least a first stimulus and transforms from the closed phase to the open phase upon exposure to at least a second stimulus, wherein the first stimulus is light of a first wavelength, and the second stimulus is light of a second wavelength.

2. The photosensitive sorbent material of claim 1, wherein the photochemical transformation is a photoisomerization reaction or a photocyclization reaction.

3. The photosensitive sorbent material of claim 2, wherein the photosensitive ligand comprises an azobenzene, a fulgide, a spirobenzopyran, or a dithienylethene.

4. The photosensitive sorbent material of claim 3, wherein the photosensitive ligand comprises a bis-3-thienylcyclopentene.

5. The photosensitive sorbent material of claim 4, wherein the photosensitive ligand is 1,2-bis[2-methyl-5-(4-pyridyl)-3-thienyl]perfluorocyclopentene (BTCP).

6. The photosensitive sorbent material of claim 1, wherein the bridging ligand is a dicarboxylate or N-donor linker.

7. The photosensitive sorbent material of claim 6, wherein the bridging ligand comprises a benzene-1,4-dicarboxylic acid or a pyridine.

8. The photosensitive sorbent material of claim 7, wherein the bridging ligand comprises 2,5-diphenylbenzene-1,4-dicarboxylic acid (DPT) or 2,5-di-(4-fluorophenyl)benzene-1,4-dicarboxylic acid (FDPT).

9. The photosensitive sorbent material of claim 1, wherein the metal is selected from a group consisting of Ag, Ca, K, Zn, Na, Pb, Mn, Fe, Co, Ni, Al, Cu, Sn, Cd, Hg, Cr, Fe, Bi, Ga, Ge, Au, In, Tl, Rb, Cs, As, Sb, Zn, V, Pt, Pd, and Rh.

10. The photosensitive sorbent material of claim 9, comprising $Cd(BTCP)(DPT)_2$ or $Cd(BTCP)(FDPT)_2$.

11. A device for concentration of a target chemical species, the device comprising:

(i) a photosensitive sorbent material disposed on a solid substrate, wherein the photosensitive sorbent material comprises:

a metal;

a photosensitive ligand of the metal, wherein the photosensitive ligand is reversibly transformable between two different molecular structures according to a photochemical transformation; and a bridging ligand that coordinates two or more metal atoms, and wherein the photosensitive sorbent material is configured to reversibly transform from an open phase for adsorption of the target chemical species to a closed phase with a stepped isotherm profile upon exposure to at least one stimulus, wherein at least a portion of the photosensitive sorbent material transforms from the open phase to the closed phase upon exposure to at least a first stimulus and transforms from the closed phase to the open phase upon exposure to at least a second stimulus, wherein the first stimulus is light of a first wavelength, and the second stimulus is light of a second wavelength, wherein the photosensitive sorbent material adsorbs the target chemical species in an open phase;

(ii) a body housing the photosensitive sorbent material, wherein the body comprises an inflow conduit to direct a feedstock onto the photosensitive sorbent material and an outflow conduit to direct an effluent away from the photosensitive sorbent material;

(iii) a first light source within the body, wherein the first light source is configured to emit light of the first wavelength on the photosensitive sorbent material to transform the photosensitive sorbent material into a closed phase for desorption; and (iv) a collection apparatus for collecting the target chemical species.

12. The device of claim 11, wherein the device further comprises a second light source, wherein the second light source irradiates light of a second wavelength on the photosensitive sorbent material to transform the photosensitive sorbent material into an open phase.

13. The device of claim 11, wherein the first light source is further configured to emit light of a second wavelength.

14. The device of claim 11, wherein the light of the first wavelength is between 100 nm and 400 nm.

15. The device of claim 12, wherein the light of the second wavelength is between 400 nm and 800 nm.

16. A method for concentrating a target chemical species, wherein the method comprises:

capturing a feedstock comprising the target chemical species with an inflow, directing the feedstock to a photosensitive sorbent material in an open phase, wherein the photosensitive sorbent material adsorbs the target chemical species from the feedstock to form an effluent, irradiating the photosensitive sorbent material that has adsorbed the target chemical species with light of a first wavelength to transform the photosensitive sorbent material to a closed phase to release the target chemical species, collecting the target chemical species released from the photosensitive sorbent material in a collection apparatus, and directing the effluent away from the photosensitive sorbent material.

17. The method of claim 16, wherein the method further comprises irradiating the photosensitive sorbent material that has released the target chemical species with light of a second wavelength to transform the photosensitive sorbent material to the open phase.

18. The method of claim 16, wherein the target chemical species is water vapor, wherein the feedstock is atmospheric air, and wherein liquid water is collected after release.

19. The method of claim 16, wherein the target chemical species is carbon dioxide, and wherein the feedstock is atmospheric air.

20. The method of claim 16, wherein the method further comprises using of a first photosensitive sorbent material to capture a first target chemical species and a second photosensitive sorbent material to capture a second target chemical species.

* * * * *